United States Patent
Won et al.

(10) Patent No.: US 10,009,187 B2
(45) Date of Patent: Jun. 26, 2018

(54) METHOD AND DEVICE FOR GROUP COMMUNICATION, HAVING ROBUST MOBILITY

(71) Applicant: Samsung Electronics Co., Ltd., Suwon-si, Gyeonggi-do (KR)

(72) Inventors: Sung Hwan Won, Seoul (KR); Songyean Cho, Seoul (KR); Erik Guttman, Waibstadt (DE)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

(21) Appl. No.: 14/762,659

(22) PCT Filed: Oct. 28, 2014

(86) PCT No.: PCT/KR2014/010207
§ 371 (c)(1),
(2) Date: Jul. 22, 2015

(87) PCT Pub. No.: WO2015/065022
PCT Pub. Date: May 7, 2015

(65) Prior Publication Data
US 2015/0365963 A1 Dec. 17, 2015

(30) Foreign Application Priority Data

Oct. 28, 2013 (KR) .................. 10-2013-0128790
Nov. 5, 2013 (KR) .................. 10-2013-0133730
(Continued)

(51) Int. Cl.
*H04W 88/02* (2009.01)
*H04L 12/18* (2006.01)
(Continued)

(52) U.S. Cl.
CPC ............ *H04L 12/18* (2013.01); *H04L 12/189* (2013.01); *H04W 4/06* (2013.01);
(Continued)

(58) Field of Classification Search
None
See application file for complete search history.

(56) References Cited

U.S. PATENT DOCUMENTS

2009/0201884 A1* 8/2009 Chaponniere ......... H04W 92/20
370/332
2010/0074109 A1* 3/2010 Klingenbrunn ....... H04W 36/16
370/230
(Continued)

FOREIGN PATENT DOCUMENTS

EP          2 640 143 A1    9/2013
KR    10-2012-0086746 A    8/2012

OTHER PUBLICATIONS

QUALCOMM Incorporated; Clarifications on interface between the BMSC and the GCSE application server; SA WG2 Meeting #98; S2-132551; Jul. 15-19, 2013; Valencia, Spain.
(Continued)

*Primary Examiner* — Edan Orgad
*Assistant Examiner* — Sithu Ko
(74) *Attorney, Agent, or Firm* — Jefferson IP Law, LLP

(57) ABSTRACT

The present invention relates to a method and apparatus for group communication. In more detail, the present invention relates to a method and apparatus for allowing a terminal to participate in group communication effectively on the move, and a communication method of a base station in a mobile communication system according to the present invention includes receiving Multimedia Broadcast Multicast Service (MBMS) bearer information including a QoS parameter from a Multi-cell/multicast Coordination Entity (MCE);
(Continued)

updating bearer information for a terminal using the received MBMS bearer information; making a handover decision of the terminal and transmitting a handover request message including the MBMS bearer information to a Mobility Management Entity (MME) or a second base station which does not support MBMS; transmitting a handover command message from the second base station to the terminal; and forwarding MBMS data to the second base station during a predetermined period. The group communication service reception method and apparatus of the present invention is advantageous in that a terminal participated in group communication is capable of receiving the group communication service seamlessly, even when the terminal enters an area not supporting MBMS, by switching the communication path to a Point-To-Point (PTP) communication path quickly.

14 Claims, 9 Drawing Sheets

(30) Foreign Application Priority Data

| Dec. 19, 2013 | (KR) | 10-2013-0159487 |
| Feb. 6, 2014 | (KR) | 10-2014-0013853 |
| May 9, 2014 | (KR) | 10-2014-0055911 |
| Jul. 29, 2014 | (KR) | 10-2014-0096823 |

(51) Int. Cl.
  *H04W 28/02* (2009.01)
  *H04W 76/28* (2018.01)
  *H04W 4/06* (2009.01)
  *H04W 36/00* (2009.01)
  *H04W 36/02* (2009.01)
  *H04W 76/40* (2018.01)
  *H04W 4/02* (2018.01)

(52) U.S. Cl.
  CPC ....... *H04W 28/0268* (2013.01); *H04W 36/00* (2013.01); *H04W 36/02* (2013.01); *H04W 76/28* (2018.02); *H04W 4/02* (2013.01); *H04W 76/40* (2018.02)

(56) References Cited

U.S. PATENT DOCUMENTS

| 2010/0265823 | A1* | 10/2010 | Zhao | H04W 28/12 370/233 |
| 2012/0155282 | A1* | 6/2012 | Dorenbosch | H04W 72/005 370/241.1 |
| 2013/0012243 | A1 | 1/2013 | Nishida et al. | |
| 2013/0083713 | A1* | 4/2013 | Johansson | H04W 52/0225 370/311 |
| 2013/0136036 | A1* | 5/2013 | Chen | H04W 28/24 370/260 |
| 2014/0241227 | A1* | 8/2014 | Wu | H04W 52/0216 370/311 |
| 2015/0063240 | A1* | 3/2015 | Worrall | H04W 72/0486 370/329 |
| 2015/0092542 | A1* | 4/2015 | Yang | H04W 28/0268 370/230 |

OTHER PUBLICATIONS

General Dynamics Broadband UK; Unicast/eMBMS switching for MuSe services; SA WG2 Meeting S2#99; S2-133373; Sep. 23-27, 2013; Xiamen, China.

QUALCOMM Incorporated; GCSE Service continuity during unicast and MBMS switching; SA WG2 Meeting #99; S2-133446; Sep. 23-27, 2013; Xiamen, China.

Motorola Solutions, Discussion paper on QCI Values for Public Safety Services, SA WG2 Meeting #103, May 19-23, 2014, S2-141613, XP050836047, Phoenix, Arizona, USA.

Motorola Solutions, QCI Values for Public Safety Services, SA WG2 Meeting #103, May 19-23, 2014, S2-141614, XP050836048, Phoenix, Arizona, USA.

Kodiak Networks Inc, Response to NTIA Notice of Inquiry on Requirements on Behalf of the First Responder Network Authority, Nov. 30, 2012, Version 1.1, XP055397624.

European Search Report dated Aug. 23, 2017, issued in the European Application No. 14858308.1.

Vodafone, GCSE QCIs and connected mode DRX, SA WG2 Meeting #101bis, S2-140829, Feb. 17-21, 2014, San Jose Del Cabo, Mexico.

European Office Action dated Apr. 3, 2018, issued in the European application No. 14 858 308.1.

* cited by examiner

METHOD AND DEVICE FOR GROUP COMMUNICATION, HAVING ROBUST MOBILITY

TECHNICAL FIELD

The present invention relates to a method and apparatus for group communication. In more detail, the present invention relates to a method and apparatus for allowing a terminal to participate in group communication effectively on the move.

BACKGROUND ART

Mobile communication systems were developed to provide the subscribers with voice communication services on the move. With the rapid advance of technologies, the mobile communication systems have evolved to support high speed data communication services beyond the early voice-oriented services.

Until now, the development of wireless communication systems have been focused on Point-To-Point (PTP) communication mode. Here, the term "point" denotes calling party (or called party) in a case when two users (calling and called parties) are communicating each other). In an exemplary situation when a user attempts accessing a website, e.g. http://www.amazon.com/, the two points are the user and the amazon server respectively.

Recently, the interest about group communication service through a wireless communication system increases. Group communication is a general term used to describe communication among multiple participants such as broadcast.

The group communication service may be provided through the legacy PTP communication scheme. In the broadcast example, a broadcast provider provides communication paths established between the broadcast provider and a plurality of users interested in the broadcast. However, this method is very inefficient in view of resource utilization. In an exemplary case where a plurality of users request for the same or similar data, transmitting the common data to the plural users through the user-specific PTP paths repeatedly results in significant resource utilization inefficient.

There is therefore a need of a Point-To-Multipoint (PTM) mode for group communication service that is capable of utilizing resource efficiently. For PTM mode communication, Long Term Evolution (LTE) adopts Multimedia Multicast Broadcast Service (MBMS). The issue about providing a group communication service through MBMS is discussed actively in the $3^{rd}$ Generation Partnership Project (3GPP).

DISCLOSURE OF INVENTION

Technical Problem

The present invention aims to provide a group communication service reception method and apparatus of a terminal that is capable of receiving group communication service seamlessly on the move in a wireless communication system providing the group communication service through MBMS. Also, the present invention aims to provide a group communication service reception method and apparatus of a terminal that is capable of receiving the group communication service seamlessly, even when the terminal enters an area not supporting MBMS, by switching the communication path to a Point-To-Point (PTP) communication path quickly.

The objects of the present invention are not limited to the aforesaid, and other objects not described herein with be clearly understood by those skilled in the art from the descriptions below.

Solution to Problem

In accordance with an aspect of the present invention, a communication method of a base station in a mobile communication system includes receiving Multimedia Broadcast Multicast Service (MBMS) bearer information including a QoS parameter from a Multi-cell/multicast Coordination Entity (MCE); updating bearer information for a terminal using the received MBMS bearer information; making a handover decision of the terminal and transmitting a handover request message including the MBMS bearer information to a Mobility Management Entity (MME) or a second base station which does not support MBMS; transmitting a handover command message from the second base station to the terminal; and forwarding MBMS data to the second base station during a predetermined period.

Preferably, the QoS parameter includes at least one of QoS Class Identifier (QCI), Guaranteed Bit Rate (GBR) QoS information, and Allocation and Retention Priority (ARP). Depending on embodiment, the ARP may include at least one of a priority level for bearer allocation and maintenance, pre-emption capability (compared to other bearers), and pre-emption vulnerability (compared to other bearers).

Preferably, the base station may be located at an edge of an MBMS service area or an MBMS Single Frequency Network (MBSFN) area.

Preferably, the handover request message may include at least one of the QoS parameter, bearer identifier, downlink (DL) transmission proposal indicator, Transport Layer address of S-GW, and Tunnel Endpoint Identifier (TEID) of the S-GW for uplink (UL) Packet Data Unit (PDU).

Preferably, the handover request message may further include an indicator indicating that the MBMS bearer information is included.

Preferably, updating the bearer information comprises receiving a message including information indicating of receiving or being interested in receiving the MBMS service from the terminal.

Preferably, forwarding the MBMS data to the second base station during the predetermined period includes transmitting to the second base station the data having an indicator indicating that the MBMS data transmission stops.

Preferably, transmitting the MBMS data to the second base station during the predetermined period includes receiving information with an indicator instructing to stop transmission of the MBMS data.

In accordance with another aspect of the present invention, a communication method of a terminal in a mobile communication system includes transmitting a message having information indicating of receiving or being interested in received an MBMS service to a first base station which has received MBMS bearer information including a QoS parameter form an MCE; receiving a handover command message for handover to a second base station which does not support MBMS from the first base station according to the handover decision of the first base station; establishing a connection with the second base station; receiving MBMS message forwarded by the first base station during a predetermined period from the second base station; transmitting a message including information indicating unavailability of the MBMS service to a GCSE-AS; and establishing a bearer with the second base station.

Preferably, the information indicating the unavailability of the MBMS service includes at least one of a first eNB identifier, a second eNB identifier, a source cell identifier, a target cell identifier, a terminal identifier, information notifying that the terminal has move to a cell not supporting MBMS, one or more MBMS service area identifiers (SAIs), and a group communication service identifier (ServiceId).

In accordance of another aspect of the present invention, a base station includes a communication unit and a control unit which controls receiving Multimedia Broadcast Multicast Service (MBMS) bearer information including a QoS parameter from a Multi-cell/multicast Coordination Entity (MCE); updating bearer information for a terminal using the received MBMS bearer information; making a handover decision of the terminal and transmitting a handover request message including the MBMS bearer information to a Mobility Management Entity (MME) or a second base station which does not support MBMS; transmitting a handover command message from the second base station to the terminal; and forwarding MBMS data to the second base station during a predetermined period.

In accordance with another aspect of the present invention, a terminal includes a communication unit and a control unit controls transmitting a message having information indicating of receiving or being interested in received an MBMS service to a first base station which has received MBMS bearer information including a QoS parameter form an MCE; receiving a handover command message for handover to a second base station which does not support MBMS from the first base station according to the handover decision of the first base station; establishing a connection with the second base station; receiving MBMS message forwarded by the first base station during a predetermined period from the second base station; transmitting a message including information indicating unavailability of the MBMS service to a GCSE-AS; and establishing a bearer with the second base station.

In accordance with another aspect of the present invention, a communication method of a base station in a mobile communication system includes receiving an information request message inquiring a number of terminal receiving an MBMS service from an MCE; determining the number of terminals receiving the MBMS service; and transmitting the information on the number of terminals receiving the MBMS service to the MCE.

In accordance with another aspect of the present invention, a communication method of a terminal in a mobile communication system includes determining whether the terminal is located at an edge of an MBMS service area; transmitting information indicating that the UE is located at the edge of the MBMS service area to a GCSE-AS, receiving a keep-alive message from the GCSE-AS, and communicating signals with the GCSE-AS through a Point To Point (PTP) path.

Preferably, receiving the keep-alive message includes transmitting a message including information requesting the GCSE-AS to transmit the keep-alive message.

Preferably, determining whether the terminal is located at the edge of the MBMS service area includes receiving an edge indicator indicating that the terminal is located at the edge of the MBMS service area from the base station.

Preferably, determining whether the terminal is located at the edge of the MBMS service area includes measuring a Reference Signal (RS); and determining whether the terminal is located at the edge of the MBMS service area by comparing the RS with a predetermined threshold value.

Preferably, the method further includes receiving the threshold value from the GCSE-AS or the base station.

Advantageous Effects of Invention

The group communication service reception method and apparatus of the present invention is advantageous in that a terminal participated in group communication is capable of receiving the group communication service seamlessly, even when the terminal enters an area not supporting MBMS, by switching the communication path to a Point-To-Point (PTP) communication path quickly.

The advantages of the present invention are not limited to the aforesaid, and other advantages not described herein be clearly understood by those skilled in the art from the descriptions below.

MODE FOR THE INVENTION

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention. Further, the following terms are defined in consideration of the functionality in the present invention, and may vary according to the intention of a user or an operator, usage, etc. Therefore, the definition should be made on the basis of the overall content of the present specification.

Although the description is mainly directed to the radio access network, LTE core network, and Evolved Packet Core (EPC) specified in the 3GPP standard, it will be understood by those skilled in the art that the present invention can be applied even to other communication systems having the similar technical background and channel format, with a slight modification, without departing from the spirit and scope of the present invention.

Figure 1:
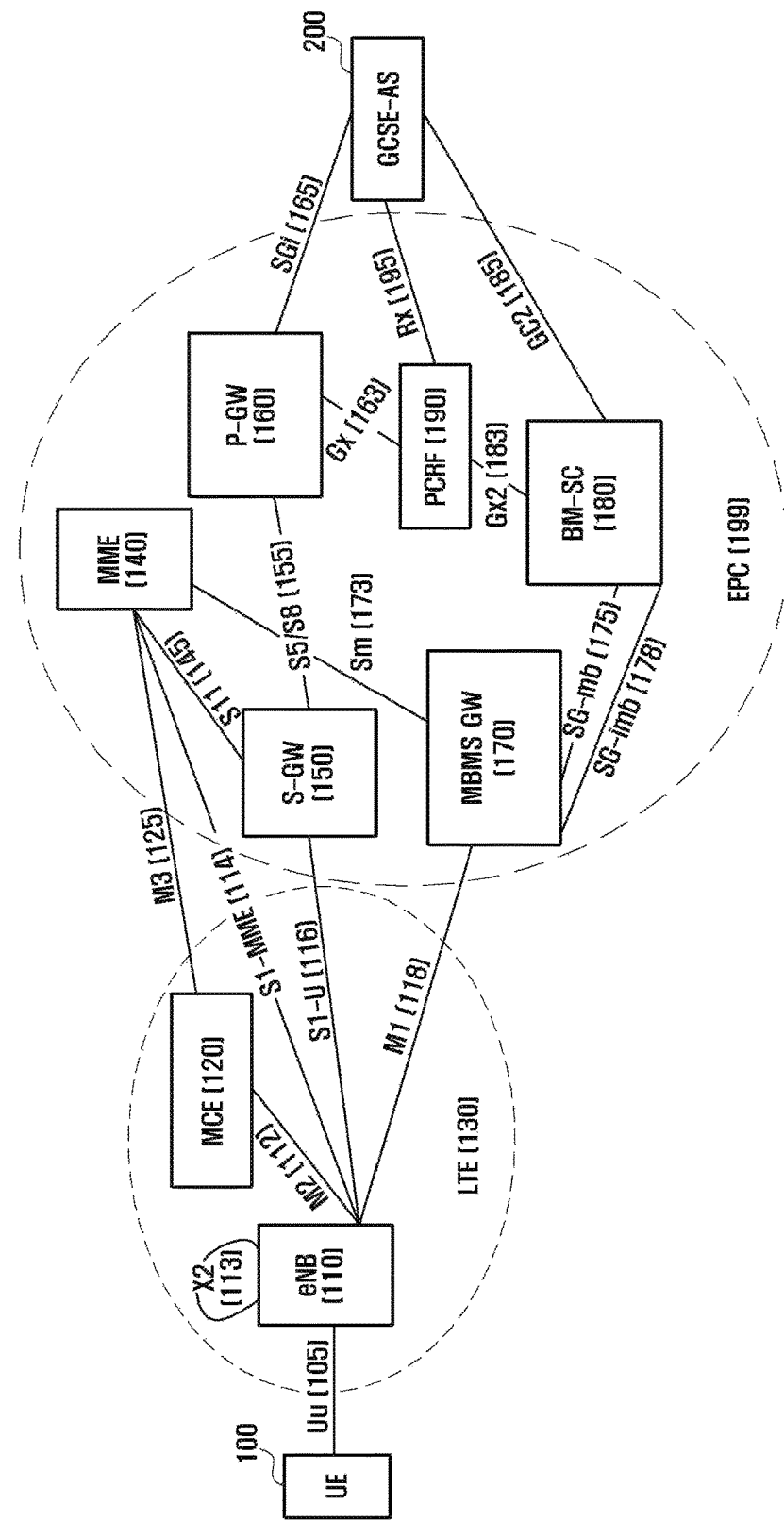
FIG. 1 is a diagram illustrating a wireless communication system for providing a group communication service through MBMS according to an embodiment of the present invention.

FIG. 1 is a diagram illustrating a wireless communication system for providing a group communication service through MBMS according to an embodiment of the present invention.

The wireless communication system providing the group communication service through Multimedia Broadcast Multicast Service (MBMS) is comprised of four elements. Referring to FIG. 1, the wireless communication system providing the group communication service through MBMS includes a User Equipment (UE) 100, a Long Term Evolution (LTE) 130, an Evolved Packet Core (EPC) 199, and a Group Communication Service Enabler Application Server (GCSE-AS) 200.

The GCSE-AS 200 is an entity at which the group communication service data gathered. The uplink (UL) data transmitted by the UE 100 participated in the group communication are collected at the GCSE-AS 200 via the LTE 130 and the EPC 199. The downlink (DL) group communication data are delivered from the GCSE-AS 200 to the UE 100 via the EPC 199 and the LTE 130.

The UE 100 is connected to the LTE 130 through a radio interface Uu 105 (typically other interfaces are wire interfaces). In more detail, the UE 100 connects to an evolved Node B (eNB) 110 through the Uu interface 105.

The LTE 130 is a network of a plurality of eNBs connected complicatedly. The eNBs 110 are connected to each other through X2 interface 113. Each eNB 110 serves the UE within its service area which is called coverage. Since the coverage is restricted, the UE 100 has to establish a radio connection with an appropriated eNB 110 through the Uu interface 105 on the move.

Excluding some exception, it is typical that the eNB 110 forms one or more cells. Here, the cell is of a typical cellular system, and the eNB 110 manages and controls the cell. In the following description, the terms "cell" and "eNB" are interchangeably used in the same meaning for convenience purpose. Also, when describing the embodiments of the present invention, the terms "cell" and "eNB" are interchangeably used in the same meaning for convenience purpose.

The DL group communication user data transmitted to the eNB 110 may be delivered to the UE through at least two paths. One is a Point-To-Point (PTP) mode communication path, and the other is a MBMS path. The PTP mode communication path is the path for transferring the DL group communication data to the eNB 110 via the GCSE-AS 200, the Public Data Network Gateway (P-GW) 160, and the serving gateway (S-GW) 150 (order of passing interfaces: SGi 165→S5/S8 155→S1-U 116). The MBMS path is the path for transferring the DL group communication user data to the eNB 110 via the GCSE-AS 200, the Broadcast Multicast Service Center (MB-SC) 180, and the MBMS Gateway (MBMS GW) 170 (order of passing interfaces: GC2 185→SGi-mb 178→M1 118).

The UL group communication user data transmitted from the UE 100 to the eNB 110 may be sent to the GCSE-AS 200 through the PTP mode communication path. That is, the UL group communication user data are sent to the GCSE-AS 200 via the eNB 110, S-GW 150, and P-GW 160.

The Policy and Charging Rules Function (PCRF) 190 is responsible for determining service flow-specific Quality of Service (QoS) and billing policy for group communication user data. The PCRF 190 connects to the P-GW 160 and BM-SC 180 via a Gx interface 163 and Gx2 interface 183, respectively, and to the GCSE-AS 200 via an Rx interface 195.

In order to control the DL group communication user data transfer through MBMS, it may be necessary to send the eNB 110 the MBMS session information such as multicast channel resource allocation information and Modulation and Coding Scheme (MCS). This information may be transmitted from at least one of Multi-cell/multicast Coordination Entity (MCE) 120, Mobility Management Entity (MME) 140, MBMS-GW 170, and GCSE-AS 200 to the eNB 110. In order to transmit the MBMS session information, the interfaces for transmission from the GCSE-AS 200, BM-SC 180, MBMS-GW 170, MME 140, and MCE 120 to the eNB 110 are defined respectively (see table 1).

TABLE 1

| Interface name | Connected entity |
| --- | --- |
| GC2(185) | GCSE-AS(200), BM-SC(180) |
| SGmb(175) | BM-SC(180), MBMS-GW(170) |
| Sm(173) | MBMS-GW(170), MME(140) |
| M3(125) | MME(140), MCE(120) |
| M2(112) | MCE(120), eNB(110) |

As described above, the DL group communication user data transferred to the eNB may be delivered through the PTP mode communication path and/or the MBMS path. Depending on embodiment, in the area where the UEs which are interested in and/or capable of receiving the DL group communication user data are concentrated (if possible to providing MBMS), it is preferred to provide the UEs with the group communication service through the MBMS path. In the area where the UEs which are interested in and/or capable of receiving the DL group communication user data are scarce, it is preferred to provide each UE with the group communication service in the PTP mode.

Depending on embodiment, if the UE 100 enters a non-MBMS area, the group communication service has to be provided in the PTP mode compellingly. In contrast, if the UE 100 moves from the non-MBMS area to the MBMS area, the group communication service mode may be switched from PTP-based group communication service mode to the MBMS-based group communication service mode.

As described above, the UE 100 may switch between the PTP mode and MBMS mode for the resource efficiency and mobility. At this time, the mode switching decision may be made by the GCSE-AS 200.

In the case of switching between the PTP and MBMS modes for resource utilization efficiency, the UE 100 which is receiving the service may be in the area supporting both the PTP and MBMS modes. Accordingly, there is room for maintaining the group communication service seamlessly in switching between the operations modes. For example, when switching from the PTP mode to the MBMS mode, the UE may receive the group communication service in the PTP mode until the communication path for MBMS is prepared.

Even in the case of switching from the PTP mode to the MBMS mode for mobility, it is possible to maintain the group communication service seamlessly. When moving from the cell supporting on the normal PTP mode to the cell supporting both the MBMS and PTP modes, the UE 100 may receive the group communication service in the PTP mode until the communication path for MBMS is prepared. Although the description is directed to the case that the cell supporting the MBMS mode also supports the PTP mode and the cell not supporting the MBMS mode supports only the PTP mode, the present invention is not limited thereto. For example, there may be a cell which supports only the MBMS mode and, even to this case, the present invention may be applied too.

Meanwhile, when switching from the MBMS mode to the PTP mode, the group communication service may cut off. For example, if the UE 100 moves to a non-MBMS cell, it may not receive the group communication service correctly anymore. In this case, upon moving to the non-MBMS cell, the group communication service cuts off and thus the UE 100 has to request the GCSE-AS 200 for the group communication service again. Accordingly, the UE 100 may not receive the group communication service until the group communication service restarts.

Meanwhile, the group communication service may be useful for very important job. For example, it may be used by the police and firefighters for public security. In this case, the cutoff phenomenon of the group communication service may cause very unpleasant situation. The embodiments of the present invention propose the methods for overcoming and mitigating the cutoff phenomenon in the group communication service.

Figure 2:
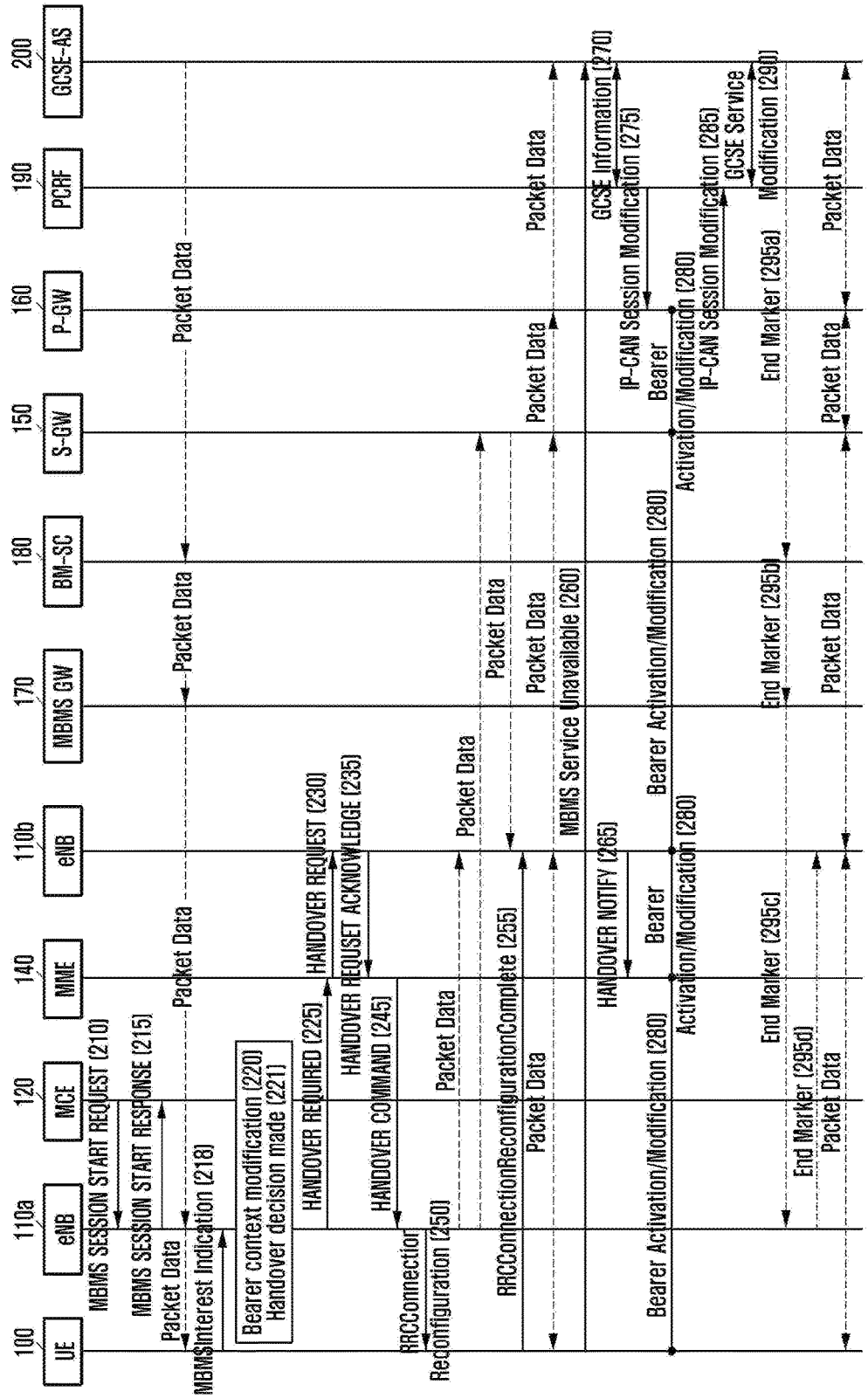
FIG. 2 is a signal flow diagram illustrating a S1-based handover procedure according to an embodiment of the present invention.

FIG. 2 is a signal flow diagram illustrating a S1-based handover procedure according to an embodiment of the present invention.

According to an embodiment of the present invention, a radio bearer for a group communication service is established to the eNB 110*b* in advance so as to mitigate the cutoff phenomenon of the group communication service.

Referring to FIG. 2, before starting S1-based handover, the MCE 120 may configure MBMS bearer information to the first eNB in establishing an MBMS session to the eNB 110*a*. The MCE 120 may send the first eNB 110*a* a message including the MBMS bearer information at step 210. The MBMS bearer information may include QoS parameters. The QoS parameters may include at least one of a QoS Class Identifier, Guaranteed Bit Rate (GBR) QoS information, and allocation and Retention Priority. The GBR QoS information may include the GBR and Maximum Bit Rate (MBR). Depending on embodiment, the message may be one of a MBMS SESSION START REQUEST message and MBMS SESSION UPDATE REQUEST message. Depending on embodiment, the ARP may include at least one of bearer allocation and maintenance priority level, pre-emption capability (against other bearers), and pre-emption vulnerability (against other bearers).

Depending on embodiment, the MBMS bearer information at step 210 may be targeted only to the selective first eNB 110*a*. The MBMS bearer information is transmitted to the first eNB 110*a* for establishing a radio bearer to the second eNB 110*b* which does not support MBMS in advance to transfer the MBMS data. Accordingly, the MBMS bearer information may be addressed only to the first eNB 110*a* located at an edge of the MBMS service area or MBMS Single Frequency Network (MBSFN).

If the message including MBMS bearer information is received at step 210, the first eNB 110*a* stores the MBMS bearer information. At step 215, the first eNB 110*a* may send the MCE 120 a response message in response to the message received at step 210. The response message may be one of MBMS SESSION START RESPONSE and MBMS SESSION UPDATE RESPONSE messages.

If an MBMS session is established normally and the MBMS radio channel setup and modification is completed in the first eNB 110*a*, the UE 100 served by the first eNB 110*a* receives the service through MBMS session. As indicated by the dotted lines in FIG. 2, the group communication data are delivered to the UE 100 via the GCSE-AS 200, the MB-SC 180, the MBMS-GW 170, and the first eNB 110*a*.

The UE 100 which is receiving the MBMS may send the first eNB 110*a* a message including the information indicating that it is receiving the MBMS or has interest in receiving the MBMS at step 218. This message may be one of MBMSInterestIndication and MBMSCountingResponse messages. Depending on embodiment, at least one of the above messages may include MBMS session, Temporary Mobile Group Identity (TMGI), and per-group communication service identifier (ServiceId) MBMS interest information. For example, at least one of the messages may include MBMS session identifiers or a bitmap of which bits representing the MBMS sessions. Here, the ServiceId may be used for identifying the group communication service. The ServiceId for identifying the group communication service may be identical with the ServiceId for MBMS or, depending on embodiment, a new identifier for group communication. The TMGI is used for identifying the MBMS bearer service as a means for providing the service identified with the ServiceId in view of the user.

If the message notifying that the UE 100 is receiving or interested in receiving the MBMS service is received from the UE 100, the first eNB 110*a* stores the received information for use in updating the bearer information for the UE 100 at step 220. In more detail, the first eNB 110*a* may modify the bearer information for the UE 100 to have the MBMS bearer information received from the MCE 120 at step 210.

Afterward, as the UE 100 moves, the first eNB 110*a* may become inappropriate for providing the UE 100 with the service anymore. The first eNB 110*a* selects the second eNB 110*b* as an eNB suitable for serving the UE 100 and makes a handover decision to the second eNB 110*b* at step 221.

The first eNB 110*a* may send the MME 140 a message including handover request information, e.g. HANDOVER REQUIRED message, at step 225. The HANDOVER REQUIRED message may include an Information Element carrying the MBMS bearer information. The IE may include at least one of QoS parameter, bearer identifier, DL transmission proposal indicator, MBMS session indicator, service Area Identity (SAI), TMGI, and ServiceId. Depending on embodiment, if the message includes the MBMS bearer information, the MBMS bearer information may include a new indicator for notifying the second eNB 110*b* that the corresponding information is associated with MBMS may be included in the MBMS bearer information. It is also possible to notify the MME 140 of the use of MBMS bearer by making agreement for use of a bearer identifier that can be allocated to the MBMS bearer in addition to the method of inserting the new indicator.

For explanation convenience, FIG. 2 is directed to the case where the MME 140 is responsible for the first and second eNBs 110*a* and 110*b*. Depending on embodiment, if the first and second eNBs 110*a* and 110*b* are associated with different MMEs, the MME associated with the first eNB 110*a* may send the MME associated with the second eNB 110*b* a Forward Relocation Request message. At this time, the message may include at least one of the QoS parameter, bearer identifier, data transmission capability indicator, and new indicator for notifying that the corresponding information is the MBMS information.

Depending on embodiment, the Forward Relocation Request message may include Evolved Radio Access Bearer (E-RAB) information. Among E-RABs, the bearer for group communication service may include at least one of the MBMS session indicator, MBMS SAI, TMGI, and ServiceId. In more detail, the MME 140 may already have at least one of the MBMS session indicator, MBMS SAI, TMGI, and ServiceId, and inter-E-RAB mapping information. The MME 140 may generate E-RAB information including at least one of the MBMS session indicator, MBMS SAI, TMGI, and ServiceId using at least one of the MBMS session indicator, MBMS SAI, TMGI and ServiceId, and the mapping information received from the first eNB 110*a*.

The MME 140 may send the second eNB 110*b* a HANDOVER REQUEST message at step 230. The HANDOVER REQUEST message may include the MBMS bearer information. Here, the MBMS bearer information may include at least one of the QoS parameter, bearer identifier, data transmission capability indicator, transport layer address of S-GW 150, and Tunnel Endpoint Identifier (TEID) of S-GW 150 for UL Packet Data Unit (PDU). The MME 140 may generate a normal PTP mode bearer information including the MBMS bearer information and sends the second eNB 110*b* the information such that the MBMS and PTP bearers are not distinct.

Depending on embodiment, the HANDOVER REQUEST message may include the E-RAB information. Among E-RABs, the bearer for group communication service may include at least one of the MBMS session indicator, MBMS SAI, TMGI, and ServiceId. In more detail, the MME 140 may already have at least one of the MBMS session indicator, MBMS SAI, TMGI, and ServiceId, and inter-E-RAB mapping information. The MME 140 may generate E-RAB information including at least one of the MBMS session indicator, MBMS SAI, TMGI, and ServiceId using at least one of the MBMS session indicator, MBMS SAI, TMGI and ServiceId, and the mapping information received from the first eNB 110*a*.

The data transmission through MBMS is made from the MBMS GW 170 other than the S-GW 150 and, since no UL data transmission is allowed, the MBMS bearer information may not include the Transport Layer address of the S-GW 150 and TEID for UL PDU, unlike the normal PTP mode bearer information. Depending on embodiment, the MME 140 may configure the Transport Layer address of the S-GW 150 and the TEID for UL PDU arbitrarily and sends them to the second eNB 110*b*. It is also possible to transmit specific transport layer address and/or TEID for UL PDU that are configured to indicate the MBMS bearer such that the second eNB 110*b* becomes aware that the corresponding bearer is the MBMS bearer.

The second eNB 110*b* may send the MME 140 a HANDOVER REQUEST ACKNOWLEDGE message at step 235. The second eNB 110*b* may determine whether to accept the bearers corresponding to the information included in the HANDOVER REQUEST ACKNOWLEDGEMENT message. The HANDOVER REQUEST ACKNOWLEDGE message may include the bearer information on the MBMS bearer accepted by the second eNB 110*b*. The MBMS bearer information may include at least one of the bearer identifier, QoS parameter, Transport Layer address of the second eNB 110*b*, TEID for DL PDU, and TEID/Transport Layer address for UL/DL data to be received from the first eNB 110*a*.

Depending on embodiment, the HANDOVER REQUEST ACKNOWLEDGE message may include the E-RAB information. Among E-RABs, the bearer for group communication service may include at least one of the MBMS session indicator, MBMS SAI, TMGI, ServiceId, and TEID/Transport Layer address for UL/DL data to be received from the first eNB 110*a*. In more detail, the second eNB 110*b* may receive the E-RAB information including at least one of the MBMS session indicator, MBMS SAI, TMGI, and ServiceId from the MME 140 at step 230. The second eNB 110*b* may add at least one of the MBMS session indicator, MBMS SAI, TMGI, and ServiceId to the E-RAB information including at least one of the MBMS session indicator, MBMS SAI, TMGI, and ServiceId received from the MME 140. The second eNB 110*b* also may add the TEID/Transport Layer address for UL/DL data to be received from the first eNB 110*a* to the E-RAB information.

The MME 140 may send the first eNB 110*a* a HANDOVER COMMAND message at step 245. Next, the first eNB 110*a* may send the UE 100 an RRCConnectionReconfiguration message to acquire synchronization with the second eNB 110*b* such that the UE 100 is served by the second eNB 110*b*.

Depending on embodiment, the HANDOVER COMMAND message may include the E-RAB information. Among E-RABs, the bearer for group communication service may include the MBMS session indicator, MBMS SAI, TMGI, ServiceId, and TEID/Transport Layer address for UL-DL data to be received from the first eNB 110*a*. The above information may be transmitted from the eNB 110*b* to the MME 140 at step 235.

As indicated by the dotted line in FIG. 2, if the HANDOVER COMMAND message is received at step 245, the first eNB 110*a* may forward the MBMS data to the second eNB 110*b* using the Transport Layer address and TEID contained in this message. Depending on embodiment, if direct data transfer is possible, the data are transmitted from the first eNB 110*a* to the second eNB 110*b* directly and, otherwise, via the S-GW 150.

This data transfer is made in such a way of transmitting the data, which has been received through the MBMS path (MBMS E-RAB), through the PTP path (PTP E-RAB). The MBMS E-RAB and PTP E-RAB may be mapped by comparing at least one of the MBMS session indicator, MBMS SAI, TMGI, and ServiceId received at step 245 with the MBMS E-RAB information.

The UE 100 may send the second eNB 110*b* an RRCConnectionReconfigurationComplete message in response to the RRCConnectionReconfiguration message at step 255. As a consequence, the UE 100 and the second eNB 110*b* may communicate the UL and DL data. The UE 100 may receive the MBMS data via the GCSE-AS 200, the BM-SC 180, the MBMS GW 170, the first eNB 110*a*, and the second eNB 110*b*. Depending on embodiment, the first eNB 110*a* may forward the MBMS data to the second eNB 110*b* during a predetermined period. The predetermined period may correspond a value preset or calculated in consideration of at least one of the Time Stamp information contained in the SYNC layer header of the MBMS data and the time information received through the HANDOVER COMMAND message. If the period is too short, the group communication service may be cut off temporarily before the UE 100 is prepared for receiving the group communication service in the PTP mode (after step 290). Otherwise if the period is too long, the first eNB 100*a* may forward the MBMS data to the second eNB 100*b* unnecessary even though the UE 100 is prepared to receive the group communication service in the PTP mode already. Depending on embodiment, the first eNB 100*a* may stop forwarding the MBMS data to the second eNB 100b after the predetermined period and transmits a packet having an End Marker to notify of the end of data forwarding.

Since the MME 140 has provided the second eNB 110b the information on the S-GW 150 at step 230, the UL data may be transferred to the GCSE-AS 200 via the UE 100, the second eNB 100b, the S-GW 150, and the PGW 160.

The UE 100 may send the GCSE-AS 200 a message including the information notifying that the MBMS service is not supported through the UL data path at step 260. The message including the information notifying that the MBMS service is not supported may include at least one of the identifiers of the first and second eNBs 110a and 110b, the source cell identifier, the target cell identifier, the identifier of the UE 100, the information notifying that the UE 100 has moved to a non-MBMS cell, the MBMS SAI, the TMGI, and the ServiceId. This message may be the MBMS Service Unavailable message. As shown at this step, the ServiceId may be shared between the UE 100 and the GCSE-AS 200, i.e. a group communication identifier defined at application level.

If the RRCConnectionReconfigurationComplete message is received at step 255, the second eNB 110b may send the MME 140 a HANDOVER NOTIFY message notifying that the handover is performed successfully at step 265. Although not shown in FIG. 2, the updated bearer information (e.g. Transport Layer address and TEID) may be shared in such a way of exchanging Modify Bearer Request/Response messages between the MME 140 and the S-GW 150 and/or between the S-GW 150 and the PGW 160.

As described above, the GCSE-AS 200 may receive a message including information notifying of the unavailability of the MBMS service such as MBMS Service Unavailability message which the UE 100 uses to inform that it has moved to a non-MBMS cell at step 260. Depending on embodiment, although not depicted, the MME 140 which has received the HANDOVER NOTIFY message at step 265 may send the S-GW 150 a message notifying that the handover has been performed. This message may be the Change Notification message. At this time, the Change Notification message may include a target cell identifier. The Change Notification message may be transmitted from the S-GW 15 to the P-GW 160. The P-GW 160 may send the target cell identifier to the PCRF 190 and/or GCSE-AS 200.

The GCSE-AS 200 determines to provide the UE with the group communication service in the PTP mode and exchanges the information for use in establishing a new bearer and updating the pre-established bearer at step 270. At this time, the GCSE-AS 200 may provide the PCRF 190 with at least one of the MBMS session indicator, MBMS SAI, TMGI, ServiceId, QoS, and group communication service characteristic. The PCRF 190 may reflect the received information to bearer configuration. The aforementioned group communication service characteristic may include description on the media or flow and priority and be determined based on the information which the UE 100 transmits to the GCSE-AS 200 via the GC1 interface between the UE 100 and the GCSE-AS 200. Here, the information transferred through the GC 1 interface may include the UE profile.

Depending on embodiment, the above-described QoS may be the information different from the QoS parameter transmitted:
  from the PCRF 190 to the P-GW 160 at step 275;
  from the P-GW 160 to the S-GW 150 at step 280;
  from the S-GW 150 to the MME 140 at step 280;
  from the MME 140 to the eNB 110b at step 280; and/or
  from the MME 140 to the UE 100 at step 280.

As described above, the QoS parameter may a comprehensive information including at least one of QCI, GBR, QoS information, and ARP. Although being described in more detail later, the QoS parameter may be the configuration detail standardized for a bearer. Meanwhile, the QoS transmitted at step 270 may be less detailed than the QoS parameter. For example, the ARP may include at least one of detailed parameters such as priority level, pre-emption capability, and pre-emption vulnerability. The GCSE-AS 200 may send the PCRF 190 only the priority level, and the PCRF 190 may use the priority level and other information (e.g. MBMS session indicator, MBMS SAI, TMGI, ServiceId, and group communication service characteristic) to generate the other values of the ARP (pre-emption capability and pre-emption vulnerability).

Meanwhile, the PCRF 190 may derive the QoS parameters as follows:
  QCI: This is determined depending on the ServiceId and/or group communication service characteristic. Different CQIs may be designated for the same group communication service depending on the service characteristic. For example, the bearer configured for the UE 100 of a firefighter in charge of important responsibility in the group communication service for the firefighters may be allocated a high priority QCI. If the group communication service is recognized based on the ServiceId or the group communication service characteristic, a QCI defined newly for the group communication service may be determined. The group communication service characteristic may include a media or flow and priority information. Depending on embodiment, the priority information may be used for a purpose different from that of the priority level contained in the QoS (e.g. the priority information contained in the group communication service characteristic may be used for determining the priority of QCI and the priority level contained in the QoS may be used for determining the priority level of ARP).
  Priority level: Depending on embodiment, the priority level may be the priority level contained in the QoS as it is or derived by processing the priority level contained in the QoS. In the case of deriving the priority level by processing the priority level contained in the QoS, the PCRF 190 may has the priority level transmitted by the GCSE-AS 200 (per ServiceId) and priority level mapping configuration information generated by the PCRF 190.
  Pre-emption capability/vulnerability: This may be configured appropriately in consideration of the priority level contained in the QoS and/or the ServiceId.

The PCRF 190 may send the P-GW 160 an IP-CAN Session Modification message at step 275. Transmitting the IP-CAN Session Modification message from the PCRF 190 to the P-GW 160 may be triggered by the message received at step 270. The PCRF 190 also may send the P-GW 160 the IP-CAN Session Modification message triggered by the location information of the UE 100 which is received from the P-GW 160 which has received the Change Notification message. The IP-CAN Session Modification message may include at least one of the MBMS session identifier, MBMS SAI, TMGI, ServiceId, QoS parameter. Accordingly, the P-GW 160, the S-GW 150, the second eNB 110b, the MME 140, and the UE 100 may establish or update the bearer at step 280. At this time, the mainly created bearers are the dedicated bearers (since the default bearer has been established already). Depending on embodiment, the bearer to be updated may be a default bearer or a dedicated bearer. Depending on embodiment, the Create/Update Bearer Request message used in creating/updating the bearer may include at least one of the MBMS session indicator, MBMS SAI, TMGI, ServiceId, and QoS parameter. The MME 140 may compare the above information (at least one of the MBMS session indicator, MBMS SAI, TMGI, ServiceId, and QoS parameter) and map the E-RAB and the bearer triggered by the PCRF 190. At this time, the MME 140 may allocate an appropriate EPS bearer identifier.

In more detail, the P-GW 160 may determine the bearer based on of the MBMS session indicator, MBMS SAI, TMGI, ServiceId, and QoS parameter received from the PCRF 190 (at this time, the QoS parameter may include at least one of QCI, GBR QoS information, and ARP. Here, at least one of the QCI GBR QoS information, and ARP may be a value allocated particularly for the group communication according to the operator network.). The P-GW 160 may determine a bearer in a manner different from the normal case (e.g. when the QoS parameter is provided) using at least one of the above informations. In the normal case, the P-GW 160 may add a new IP flow to the bearer fulfilling the existing QoS parameter other than creating a new bearer. In this embodiment, however, the P-GW 160 may create/update the new bearer for the reason that at least one of the MBMS session indicator, MBMS SAI, TMGI, ServiceId information, and QoS parameter is newly transmitted. The P-GW 160 may add at least one of the MBMS session indicator, MBMS SAI, TMGI, ServiceId, and QoS parameter to the bearer context which it manages.

The P-GW 160 may send the S-GW 150 at least one of the MBMS session indicator, MBMS SAI, TMGI, ServiceId information, and QoS parameter at step 280. At this time, the message carrying the information may be a Create/Update Bearer Request message. The S-GW 150 may store at least one of the MBMS session indicator, MBMS SAI, TMGI, ServiceId information, and QoS parameter in the bearer context which it manages. The S-GW 150 may send the MME 140 at least one of the MBMS session indicator, MBMS SAI, TMGI, ServiceId information, and QoS parameter. The message carrying the information may be the Create/Update Bearer Request message. The MME 140 may store at least one of the MBMS session indicator, MBMS SAI, TMGI, ServiceId information, and QoS parameter in the bearer context which it manages. The MME 140 may send the target eNB (i.e. the second eNB) 110*b* at least one of the MBMS session indicator, MBMS SAI, TMGI, ServiceId information, and QoS parameter in the S1-based handover procedure.

The MME 140 may send the second eNB 110*b* at least one of the MBMS session indicator, MBMS SAI, TMGI, ServiceId information, and QoS parameter at step 280. The message carrying the information may be an E-RAB SETUP REQUEST message. The second eNB 110*b* may store at least one of the MBMS session indicator, MBMS SAI, TMGI, ServiceId information, and QoS parameter in the bearer context which it manages.

Meanwhile, the bearer carrying the group communication service data is necessary to be marked for reflecting the representative characteristics of the group communication service such as intermittency (e.g. characteristic of inconsecutive data transmission characteristic appearing in the service such as Push To Talk) and short delay requirement (e.g. requirement for use by persons in charge of public security such as the police. At this time, at least one of the MBMS session indicator, MBMS SAI, TMGI, ServiceId information, and QoS parameter that may be transmitted to the second eNB 110*b* via the P-GW 160, the S-GW 150, and the MME 140 may be used for marking of reflection of the characteristics of the group communication service. For example, at least one of the MBMS session indicator, MBMS SAI, TMGI, ServiceId information, and QoS parameter may be set to reflect the characteristic of the group communication service so as to identify the group communication service. Meanwhile, the QoS parameter may be the information reflecting the characteristics of the group communication service.

The QoS parameter may be set to reflect the characteristics of the group communication service as follows:
Introduce new QCI value;
create new indicator.

At this time, each QCI value is given with different combinations of Resource Type, Priority, Packet Delay Budget, and Packet Error Loss Rate. Thus, in the case of introducing a new QCI value, the new QCI value may be designated for a combination of the Resource Type, Priority, Packet Delay Budget, and Packet Error Loss Rate which is different from the previously defined QCI values.

In this case, the new QCI value may be generated for at least one of the followings. That is, the new QCI value appropriate for at least one of a Mission critical Push To Talk voice data, non-Mission critical Push To Talk voice data, Mission critical Push To Talk signaling, non-Mission critical Push To Talk signaling, Mission criticality-transparent Push To Talk signaling, normal group communication bearer (this may be divides into signaling and user data in detail), and Mission critical (video) data and public security bearer (this may be divided into signaling and user data in detail). Depending on embodiment, the resource type for the QCI value corresponding to voice data among the new QCI values may corresponds to the Guaranteed Bit Rate (GBR). The resource Type for the QCI value corresponding to signaling may be non-GBR. Depending on embodiment, in order to indicate the intermittency of the Push To Talk voice data, it is possible to define a new Resource Type value such as bursty GBR and hybrid GBR in addition to the legacy GBRs (at this time, the resource type may be called by other name representing intermittency as well as the bursty GBR and hybrid GBR). The new Resource Type value (e.g. bursty GBR and hybrid GBR) may be designated for the resource type of the QCI value corresponding to the Push To Talk voice data. Depending on embodiment, even the bearer having the new Resource Type value may include the GBR QoS information. That is, even when the resource type is not GBR, it may include GBR QoS information. In this way, a node (e.g. UE) which has no information about the new QCI value indicating the new Resource Type value may map this to an appropriate legacy GBR QCI value.

Depending on embodiment, in the case of generating new indicators, the new indicators may include an indicator indicating the bearer of which bearer context including at least one of the characteristics of intermittency and short delay time requirement.

The second eNB 110*b* may perform at least one of the following operations with at least one of the MBMS session indicator, MBMS SAI, TMGI, ServiceId information, and QoS parameter, in addition to the operations of using the legacy QoS parameters.

Transmitting at least one of the MBMS session indicator, MBMS SAI, TMGI, ServiceId information, and QoS parameter to another eNB (e.g. the third eNB) in X2 handover (this operation may follows step 340 to be described with reference to FIG. 3);

Admission control;

> For example, if the bearer is characterized by intermittency, it is possible to accept the bearer although the corresponding GBR QoS information is not supported currently.

Determining change of PTP and PTM of corresponding group communication service;

Scheduling;

Configuring and/or adjusting DRX parameter;

> For example, if relatively short delay is required (for the first packet of bursty downlink data/signaling), it is possible to shorten the DRX parameter.

Configuring and/or adjusting inactivity timer.

For example, if it is possible to recognize the group communication service with which the corresponding bearer is associated and thus a plurality of bearers for a specific group communication service are established in the second eNB 110*b*, the second eNB 110*b* may determine to provide the group communication service in the PTM mode.

The P-GW 160 may send the PCRF 190 an IP-CAN Session Modification message at step 285. The message transmitted at step 285 may include at least one of the MBMS session indicator, MBMS SAI, TMGI, ServiceId information, and QoS parameter.

Thus the UE 100 may receive the group communication service in the PTP mode. As well as the group communication data transmission method (transmitting MBMS data from the first eNB 110*a* to the second eNB 110*b* along with an End Marker during a specific time period) described with reference to step 255, it is possible to consider a method of mitigating the cutoff phenomenon of the group communication data through a method of step 295.

Part or whole of the process from step 270 to step 290 may be applied to the X2 handover to be described later. Furthermore, it may be applied to the process of creating and/or modifying a PTP bearer associated with normal group communication.

Depending on embodiment, part of the process from step 270 to step 290 may be applied to transmission in the PTM mode similarly. For example, the process in which the PCRF 190 receives the information required for configuring the QoS parameter (at least one of the MBMS session indicator, MBMS SAI, TMGI, ServiceId, QoS, and group communication service characteristic) form the GCSE-AS 200 for determining the QoS parameter and transferring the information to the communication entities 160, 150, 140, 110*b*, and 100 requiring the QoS parameter in the PTP bearer creation and/or adjustment procedure may be applied to the MBMS bearer creation and/or modification procedure similarly.

In more detail, in the case of the MBMS bearer, the GCSE-AS 200 may send the BM-SC 180 at least one of the MBMS session indicator, MBMS SAI, TMGI, ServiceId, QoS, and group communication service characteristic. The MB-SC 180 may derive the QoS parameter from the information received from the GCSE-AS 200 as the PCRF 190 does. Then the MB-SC 180 sends the MCE 120 the QoS parameter derived newly (when generating new MBMS session) or modified (when updating the old MBMS session) via the MBMS GW 170 and the MME 140. In the case of the PTP bearer, the MCE 120 may perform part of the operation performed by the eNB 110*b*. That is, by taking notice of the characteristic of the MBMS bearer (broadcast), there is no need of complicated radio resource management for the resource of the MBMS bearer, the eNB 110*b* may just forward the data from the MCE 120 using the resource for the corresponding MBMS bearer, and the MCE 120 may perform part of the functions of the eNB 110*b*. At this time, the MCE 120 may perform at least one of the following operations using the new or modified QoS parameter included in the message such as MBMS SESSION START REQUEST and MBMS SESSION UPDATE REQUEST received through the M3 interface 125.

Pre-emption process between MBMS bearers using ARP information. At this time, it may fail to deactivate the existing MBMS session or establish an MBMS session according to the priority levels of the old MBMS session and new MBMS session.

Establishing new MBMS session.

Configuring MBMS scheduling information in consideration of the new or modified QoS parameter (e.g. transmitting Physical Multicast CHannel (PMCH) configuration information and/or subframe configuration information to the eNB 110*b*).

Returning to the PTP bearer, the GCSE-AS 200 may send the BM-SC 180 at least one of the End marker, UE identifier, and source cell identifier right before transmitting the group communication data in the PTP mode at step 295*a*. Through steps 295*b* and 295*c*, the MB-SC 180 may send the first eNB 110*a* at least one of the End Marker, UE identifier, and source cell identifier via the MBMS GW 170. The first eNB 110*a* may send the second eNB 110*b* the End Marker at step 295*d*. Afterward, the first eNB 110*a* may not send the second eNB 110*b* the MBMS data.

The second eNB 110*b* sends the UE 100 the data received from the first eNB 110*a* with priority before receiving the End Marker. After receiving the End Marker, the second eNB 110*b* sends the UE 100 the data received from the S-GW 150.

The above embodiment is directed to the method of marking the new QCI value to the bearer for the group communication service in order for the Radio Access Network (RAN) and/or Core Network (CN) to handle the group communication service bearer appropriately according to its characteristic (intermittency and/or short delay time requirement).

At this time, if all of the eNBs 110 in the operator network are upgraded and share the new QCI value, they may handle the group communication service bearer appropriately. By taking notice that there are too many eNBs 110 to upgrade at a time and even some eNBs 110 out of the management of the network operator such as home eNB 110, it is difficult to expect that all of the eNBs 110 located in the operator network are upgraded at a time.

In this case, if a request for establishing a bearer having an unsupported QCI value and/or modifying the bearer having the unsupported QCI value through at least one of the bearer establishment procedure, bearer modification procedure, and handover procedure, the eNB 110*b* which has not been upgraded may notify of the bearer establishment and/or modification failure with an appropriate cause of the failure. At this time, the Cause may be set to Not supported QCI value. In this case, the bearer establishment and/or modification failure is informed to the PGW 160 via the MME 140 and the S-GW 150 such that the corresponding bearer may be released or returned to the previous state.

In this case, a message notifying/indicating of the necessity of establishing a new bearer or modifying the old bearer for providing the group communication service smoothly may be transmitted to the PGW 160 via the PCRF 190 or S-GW 150. Upon receipt of this message, the P-GW 160 may determine to establish a new bearer or modify the old bearer. For example, the P-GW 160 may transmit a Create/Update Bearer Request message to request for creating a bearer having the new QCI value. Also, the P-GW 160 may transmit an Update Bearer Request message requesting to modify the QCI value of the old bearer to a new QCI value.

The eNB 110 which is not upgraded and thus does not support the new CQI value may notify of the bearer establishment and/or modification failure with an appropriate Cause. In this case, the bearer may be released or returned to the previous state, and the PGW 160 may request for bearer establishment/modification again. Depending on embodiment, this situation may occur repeatedly while the UE 100 is served by the eNB 110.

The above-described situation may cause signaling waste and group communication service error. There is therefore a need of notifying the P-GW 160 and/or the PCRF 190 that the corresponding eNB 110 does not support the new QCI value.

Figure 9:
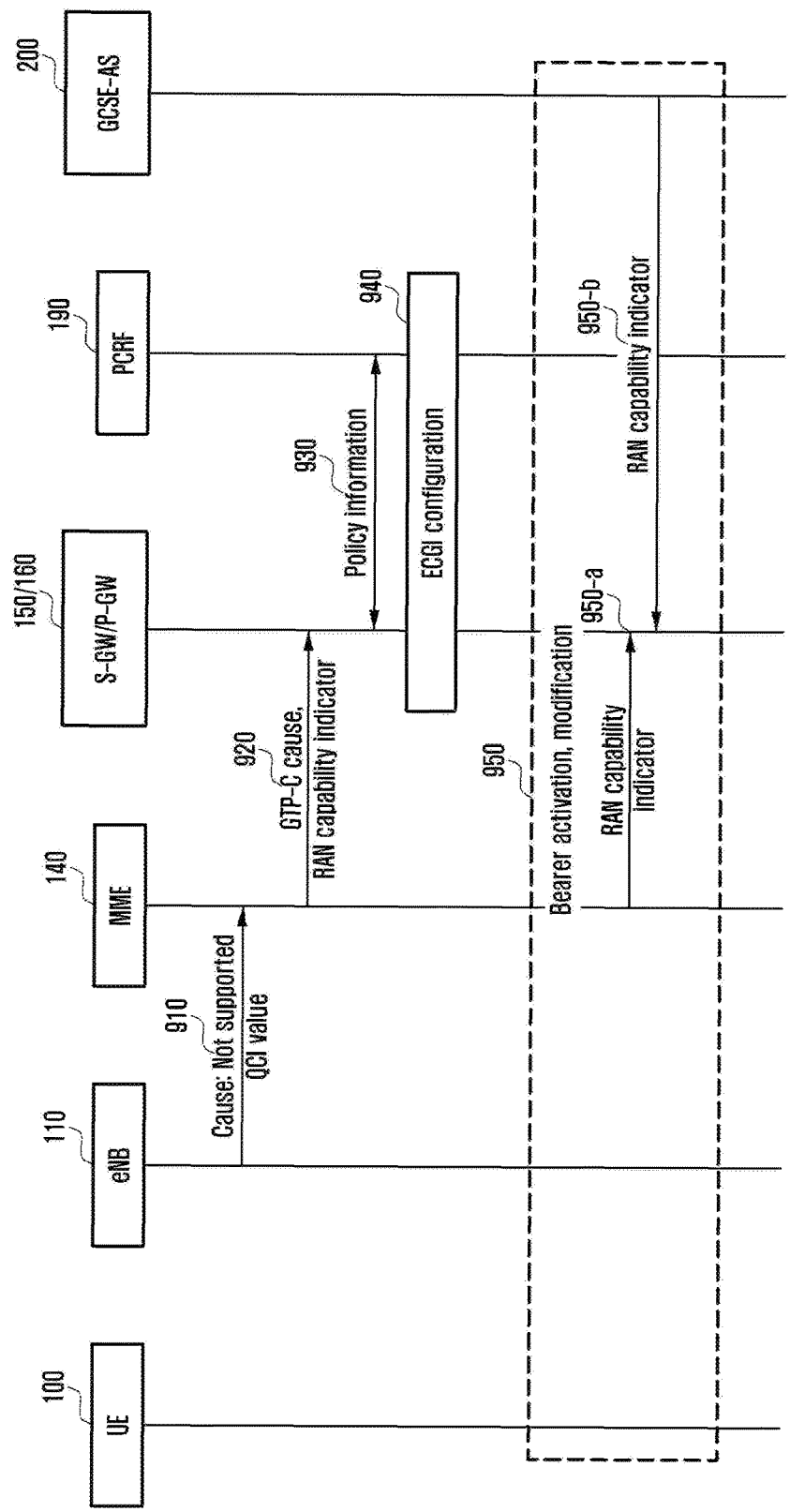
FIG. 9 is a signal flow diagram illustrating a procedure of providing a group communication service at an eNB not supporting a now QCI value according to an embodiment of the present invention.

FIG. 9 is a signal flow diagram illustrating a procedure of providing a group communication service at an eNB not supporting a now QCI value according to an embodiment of the present invention.

According to this embodiment, the P-GW 160 and/or the PCRF 190 may recognize that the eNB 110 serving the UE 100 does not support the new QCI value. It is also possible to establish a bearer having the (second best) QCI value suitable for the group communication service or modify the old bearer to have the (second best) QCI value suitable for the group communication service.

Referring to FIG. 9, the eNB 110 may notify the MME that it does not support the new QCI value at step 910. Next, the MME 140 may notify the S-GW 150 that the eNB 110 does not support the corresponding QCI value at step 920. Afterward, the S-GW 150 may notify the P-GW 160 that the eNB 110 does not support the corresponding QCI value.

The MME 140, which has recognized that the eNB 110 does not support the corresponding CQI value at step 910, may notify the S-GW 150 that the eNB 110 does not support the corresponding QCI at step 920 using one of the following methods:

Inserting an appropriate Cause (e.g. Denied in RAT and Not supported QCI value) in at least one of the Create Bearer Response, Update Bearer Response, and Modify Bearer Response message; and inserting an indicator indicating that the eNB 110 does not support the corresponding QCI value.

It is obvious that the S-GW 150 may use at least one of the methods which the MME 140 uses to notify the S-GW 150 that the eNB 110 does not support the corresponding QCI value to notify the P-GW 150 that the eNB 110 does not support the corresponding QCI value.

The P-GW 160 may exchange the information on the QCI parameter with the PCRF 190 at step 930. Accordingly, at least one of the PCRF 190 and the P-GW 160 may know that the eNB 110 does not support the corresponding CQI value. Afterward, when determining to establish and modify a bearer or sending the QoS parameter for use in making the determination, it is possible to designate a suitable QCI value for the group communication service among the CQI values supported by the eNB 110 in consideration that the eNB 110 does not support the corresponding QCI value.

Depending on embodiment, the message transmitted at step 920 may include a cell identifier (ECGI) of the eNB 110 serving the UE 100. Accordingly, if the P-GW 160 and/or the PCRF 190 have ECGI configuration information, the P-GW 160 and/or the PCRF 190 may analogize the information on whether the eNB 110 supports the corresponding QCI, at step 940, based on the ECGI contained in the message received at step 920.

Depending on embodiment, the CQI value supportability of the eNB 110 may not be notified to the P-GW 160 and thus the P-GW 160 and/or the PCRF 190 may not have the ECGI configuration information. In this case, the CQI value supportability of the eNB 110 may be notified to the P-GW 160 and/or the PCRF 190 in the bearer establishment/modification procedure at step 950.

In more detail, one approach is to receive the information on the QCI value supportability of the eNB 110 via the MME 140 at step 950-a and the other is to receive the information on CQI value supportability of the eNB 110 via the GCSE-AS 200 at step 950-b.

That is, the MME 140 may command the S-GW 150/P-GW 160 to modify the bearer resource at step 950-a. The message used at the step may be a Bearer Resource Command message. This message may include an indicator notifying that the eNB 110 does not support the corresponding QCI value. Depending on embodiment, the MME 140 may recognize that the eNB 110 does not support the corresponding QCI value by remembering the Cause value received at step 910 or receiving the information that the eNB 110 does not support the corresponding QCI value in advance in the S1 setup procedure between the eNB 110 and the MME 140.

At step 950-b, the GCSE-AS 200 which has been informed of necessity of bearer establishment/modification from the UE 100 or which has recognized the necessity of bearer establishment/modification by itself may send the P-GW 160 a message including the indicator notifying that the eNB 110 does not support the corresponding CQI value. Depending on embodiment, the indicator may be delivered via the PCRF 190.

Figure 3:
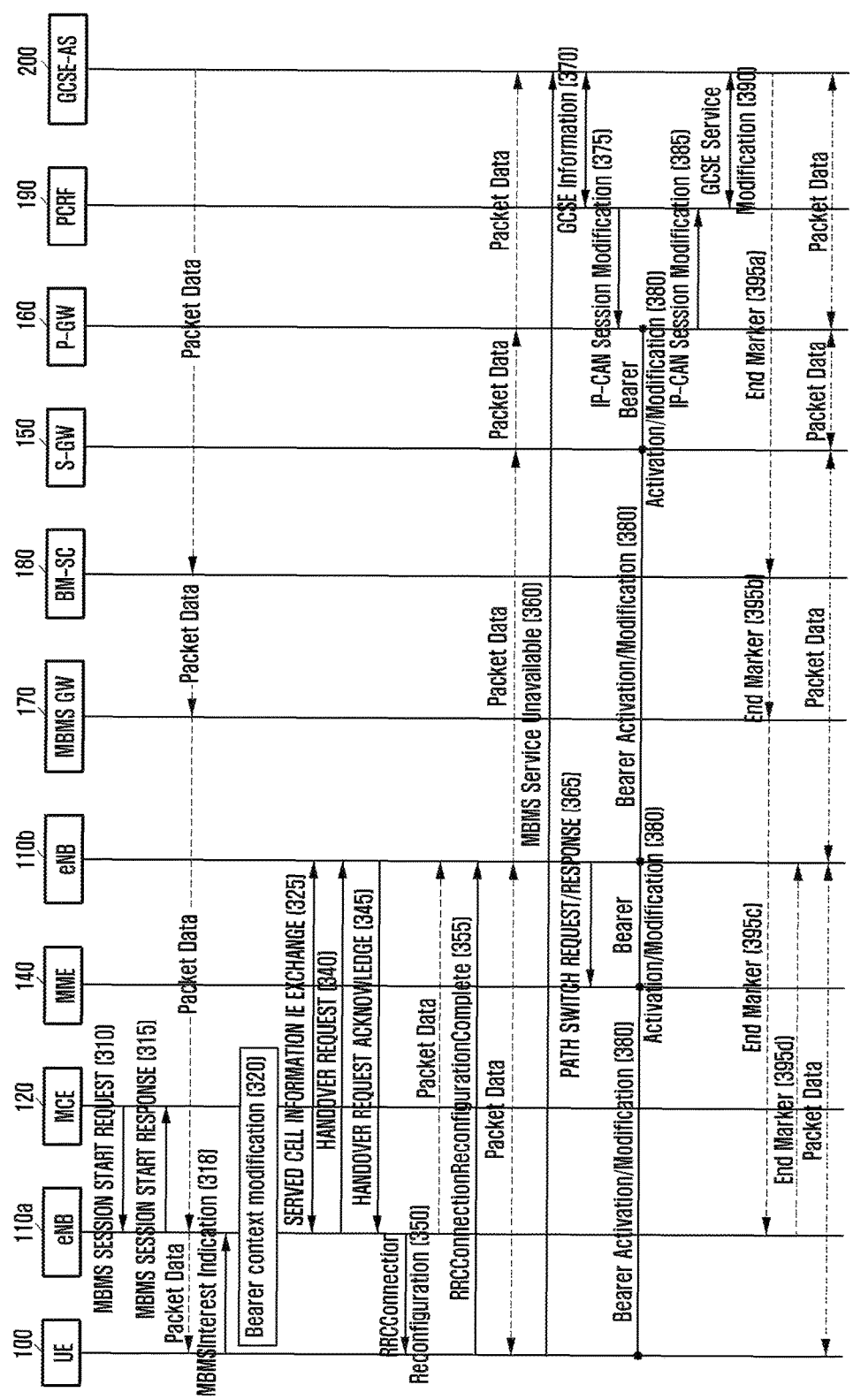
FIG. 3 is a signal flow diagram illustrating an X2-based handover procedure according to an embodiment of the present invention.

FIG. 3 is a signal flow diagram illustrating an X2-based handover procedure according to an embodiment of the present invention.

According to an embodiment of the present invention, it is possible to mitigate the group communication service cutoff phenomenon by establishing a group communication service radio bearer to the target eNB 110b in advance in the X2-based handover procedure.

Referring to FIG. 3, prior to start the X2-based handover, the MCE 120 may configure the MBMS bearer information to the first eNB 110a in establishing the MBMS session. The MCE 120 may send the first eNB 110a a message including the MBMS bearer information at step 310. The MBMS bearer information may include the QoS parameter. Since the QoS parameter has been described above, detailed description thereof is omitted herein. The message may be one of a MBMS SESSION START REQUEST message and a MBMS SESSION UPDATE REQUEST message.

Depending on embodiment, the MBMS bearer information may be transmitted to only the first eNB 110a at step 310. The MBMS bearer information is transmitted to the first eNB 110a to establish a radio bearer to the first eNB 110a which does not support MBMS in advance so as to transmit MBMS data thereto. Thus the MBMS bearer information may be addressed to only the first eNB 110 located at the edge of the MBMS service area or MBSFN area.

Upon receipt of the message including the MBMS bearer information at step 310, the first eNB 110a may store the received MBMS bearer information. The first eNB 110 may send the MCE 120 a response message at step 315 in response to the message received at step 310. The response message may be one of an MBMS SESSION START RESPONSE message and an MBMS SESSION UPDATE RESPONSE message.

If the MBMS session is established normally and the MBMS radio channel configuration and modification is completed in the first eNB 110a, the UE 100 served by the first eNB 110a may receive the service through MBMS. As indicated by the dotted line in FIG. 3, the group communication data are delivered to the UE 100 via the GCSE-AS 200, the MB-SC 180, the MBMS-GW 170, and the first eNB 110a.

The UE 100 which receives the MBMS service may send the first eNB 110a a message including the information indicating that it is receiving the MBMS service or interested in the MBMS service at step 318. This message may be one of an MBMSInterestIndication message and an MBMSCountingResponse message.

If the message including the information indicating that the UE 100 is receiving the MBMS service or interested in the MBMS service is received from the UE 100, the first eNB 110a may update the bearer information of the UE 100 at step 320. In more detail, the first eNB 110a may modify the bearer information for the UE 100 to include the MBMS bearer information received from the MCE 120 at step 310.

The first and second eNBs 110a and 110b may share the information on the MBMS services they support. The information sharing is accomplished by exchange the Served Cell Information IE including TMGI between the first and second eNBs 110a and 110b at step 325.

Afterward, as the UE 100 moves, the first eNB 110a may become unsuitable for serving the UE 100. At this time, the first eNB 110a selects the second eNB 110b suitable for serving the UE 100 and make a handover decision thereto for the UE 100.

The first eNB 110a may send the second eNB 110b a message including handover request information, e.g. HANDOVER REQUEST message, at step 340. The HANDOVER REQUEST message may include an IE carrying the MBMS bearer information. This IE may include at least one of the QoS parameter, bearer identifier, DL transmission proposal indicator, Transport Layer address of the S-GW 150, and TEID of the S-GW 150 for UL PDU. Depending on embodiment, if the message includes the MBMS bearer information, a new indicator for notifying the second eNB 110b that the corresponding information is associated with MBMS may be included in the MBMS bearer information. It is also possible to notify the second eNB 110b of the use of MBMS bearer by making agreement for use of a bearer identifier that can be allocated only for the MBMS bearer in addition to the method of inserting the new indicator.

At step 340, the first eNB 110a may transmit an IE carrying the MBMS bearer information when the UE is handed over to the second eNB 110b which does not support the corresponding MBMS bearer for each MBMS bearer through which the UE 100 is served. The transmission condition may be applied to step 225 likewise.

Since the data transmission through MBMS is made from the MBMS GW 170 other than the S-GW 150 and no UL data transmission is allowed, the MBMS bearer information may not include the Transport Layer address and TEID for UL PDU unlike the normal PTP mode bearer information. Depending on embodiment, the first eNB 110a may send the second eNB 110b the Transport Layer address of the S-GW 150 and the TEID for UL PDU that are configured arbitrarily. It is also possible to transmit a specific transport layer address and/or a TEID for UL PDU configured to indicate the MBMS bearer such that the second eNB 110b becomes aware that the corresponding bearer is the MBMS bearer.

Depending on embodiment, the HANDOVER REQUEST message may include the E-RAB information. Among E-RABs, the bearer for group communication service may include at least one of the MBMS session indicator, MBMS SAI, TMGI, and ServiceId. Since the related procedure has been described with reference to FIG. 2, detailed description thereof is omitted herein.

The second eNB 110b may send the first eNB 110a a HANDOVER REQUEST ACKNOWLEDGE message at step 345. The second eNB 110b may determine whether to accept the each of the bearers on which informations are included in the HANDOVER REQUEST ACKNOWLEDGE message. The HANDOVER REQUEST ACKNOWLEDGE message may include the informations on the bearers including the MBMS bearer accepted by the second eNB 110b. The MBMS bearer information may include at least one of bearer identifier, QoS parameter, and TEID/Transport Layer address for UL/DL data to be transmitted by the first eNB 110a.

Depending on embodiment, the HANDOVER REQUEST ACKNOWLEDGE message may include E-RAB information. Among E-RABs, the bearer for group communication service may include at least one of the MBMS session indicator, MBMS SAI, TMGI, ServiceId, and TEID/Transport Layer address for UL-DL data to be received from the first eNB 110a. In more detail, the second eNB 110b may receive the E-RAB information including at least one of the MBMS session indicator, MBMS SAI, TMGI, and ServiceId from the first eNB 110a at step 340. The second eNB 110b may add at least one of the MBMS session indicator, MBMS SAI, TMGI, and ServiceId to the E-RAB information including at least one of the MBMS session indicator, MBMS SAI, TMGI, and ServiceId received from the first eNB 110a.

Next, the first eNB 110a sends the UE 100 an RRCConnectionReconfiguration message in order for the UE 100 to acquire synchronization with the cell of the second eNB 110b to be served by the second eNB 110b.

As indicated by the dotted line in FIG. 3, if the HANDOVER REQUEST ACKNOWLEDGE message is received, the first eNB 110a forwards the MBMS data to the second eNB 110b using the Transport Layer address and TEID included in this message.

This data transfer is made in such a way of transmitting the data, which has been received through the MBMS path (MBMS E-RAB), through the PTP path (PTP E-RAB). The MBMS E-RAB and PTP E-RAB may be mapped by comparing at least one of the MBMS session indicator, MBMS SAI, TMGI, and ServiceId received at step 345 with the MBMS E-RAB information.

The UE 100 may send the second eNB 110b an RRCConnectionReconfigurationComplete message in response to the RRCConnectionReconfiguration message at step 355. As a consequence, the UE 100 and the second eNB 110b may communicate the UL and DL data. The UE 100 may receive the MBMS data via the GCSE-AS 200, the BM-SC 180, the MBMS GW 170, the first eNB 110a, and the second eNB 110b. Depending on embodiment, the first eNB 110a may forward the MBMS data to the second eNB 110b during a predetermined period. The predetermined period may correspond a value preset or calculated in consideration of at least one of the Time Stamp information contained in the SYNC layer header of the MBMS data and the time information received through the HANDOVER COMMAND message. If the period is too short, the group communication service may be cut off temporarily before the UE 100 is prepared for receiving the group communication service in the PTP mode (after step 390). Otherwise, if the period is too long, the first eNB 100a may forward the MBMS data to the second eNB 100b unnecessary even though the UE 100 is prepared to receive the group communication service in the PTP mode already. Depending on embodiment, the first eNB 100a may stop forwarding the MBMS data to the second eNB 100b after the predetermined period and transmits a packet having an End Marker to notify of the end of data forwarding.

Since the first eNB 110a has provided the second eNB 110b the information on the S-GW 150 at step 340, the UL data can be transferred to the GCSE-AS 200 via the UE 100, the second eNB 100b, the S-GW 150, and the PGW 160.

The UE 100 may send the GCSE-AS 200 a message including the information notifying that the MBMS service is not supported through the UL data path at step 360. The message including the information notifying that the MBMS service is not supported may include at least one of the identifiers of the first and second eNBs 110a and 110b, the source cell identifier, the target cell identifier, the identifier of the UE 100, the information notifying that the UE 100 has moved to a non-MBMS cell, the MBMS SAI, the TMGI, and the ServiceId. This message may be the MBMS Service Unavailable message.

If the RRCConnectionReconfigurationComplete message is received at step 355, the second eNB 110b may send the MME 140 a PATH SWITCH REQUEST message notifying that the handover is performed successfully at step 365. This message may include the MBMS bearer information. The MBMS bearer information may include at least one of bearer identifier, Transport Layer address of the second eNB 110b, TEID for DL PDU, and an indicator notifying that the corresponding bearer is an MBMS bearer. Instead of notifying that the corresponding bearer is an MBMS bearer using the indicator explicitly, it is possible to use a method of indicating the use of MBMS bearer implicitly with the agreed bearer identifier, TEID, and/or Transport Layer address.

Depending on embodiment, the MME 140 may not recognize the MBMS bearer information contained in the PATH SWITCH REQUEST message in advance. The legacy MME 140 may include the information notifying of rejecting the corresponding bearer in the PATH SWITCH REQUEST ACKNOWLEDGEMENT message. For example, an E-RAB To Be Released List IE may contain the identifier of the MBMS bearer. However, if the second eNB 110b has recognized that it is located outside the boundary of an MBSFN area and thus configured the related information, the MME 140 may accept the MBMS bearer although it is not distinguished from the PTP bearer. For this situation, the location information of the second eNB 110b may be configured to the MME 149 using a device such as OAM device. If a method capable of checking that the corresponding bearer is the MBMS bearer between the MME 140 and the second eNB 110b (method of including an indicator notifying that the corresponding bearer is the MBMS bearer and method for indicating implicitly with agreed bearer identifier, TEID, and/or Transport Layer address) is used, it is not necessary mandatorily to configure the location information of the second eNB 110b in advance using a device such as OAM device.

As described above, the GCSE-AS 200 is capable of recognizing that the UE 100 has moved to a cell unsuitable for the MBMS service using the message including the information indicating that the MBMS service is not supported such as MBMS Service Unavailable message at step 360. Depending on embodiment, although not depicted, the MME 140 which has received the PATH SWITCH REQUEST message at step 365 may the S-GW 150 a message notifying that the handover has been performed. At this time, this message may be a Change Notification message. The Change Notification message may be transmitted from the S-GW 150 to the P-GW 160. The P-GW 160 may send the PCRF 190 and/or the GCSE-AS 200 the target cell identifier.

Although not shown in FIG. 3, the updated bearer information (e.g. Transport Layer address and TEID) may be shared in such a way of exchanging Modify Bearer Request/Response messages between the MME 140 and the S-GW 150 and/or between the S-GW 150 and the PGW 160.

The GCSE-AS 200 may determine to provide the group communication service in the PTP mode and exchange the information necessary for establishing a new bearer and updating the old bearer with the PCRF 190 at step 370.

The PCRF 190 may send the P-GW 160 an IP-CAN Session Modification message at step 375. Transmitting the IP-CAN Session Modification message from the PCRF 190 to the P-GW 160 may be triggered by the message received at step 370. The PCRF 190 also may send the P-GW 160 the IP-CAN Session Modification message triggered by the location information of the UE 100 which is received from the P-GW 160 which has received the Change Notification message. The IP-CAN Session Modification message may include the QoS parameter. Accordingly, the P-GW 160, the S-GW 150, the second eNB 110b, the MME 140, and the UE 100 may establish or update the bearer at step 380. The P-GW 160 may send the PCRF 190 the IP-CAN Session Modification message at step 385. The message transmitted at step 385 may include the QoS parameter.

Thus the UE 100 may receive the group communication service in the PTP mode. As well as the group communication data transmission method (transmitting MBMS data from the first eNB 110a to the second eNB 110b along with an End Marker during a specific time period) as described with reference to step 355, it is possible to consider a method of mitigating the cutoff phenomenon of the group communication data through a method of step 395.

The GCSE-AS 200 may send the BM-SC 180 at least one of the End marker, UE identifier, and source cell identifier right before transmitting the group communication data in the PTP mode at step 395a. Through steps 395b and 395c, the MB-SC 180 may send the first eNB 110a at least one of the End Marker, UE identifier, and source cell identifier via the MBMS GW 170. The first eNB 110a may send the second eNB 110b the End Marker at step 395d. Afterward, the first eNB 110a may not send the second eNB 110b the MBMS data.

The second eNB 110b sends the UE 100 the data received from the first eNB 110a with priority before receiving the End Marker. After receiving the End Marker, the second eNB 110b sends the UE 100 the data received from the S-GW 150.

Figure 4:
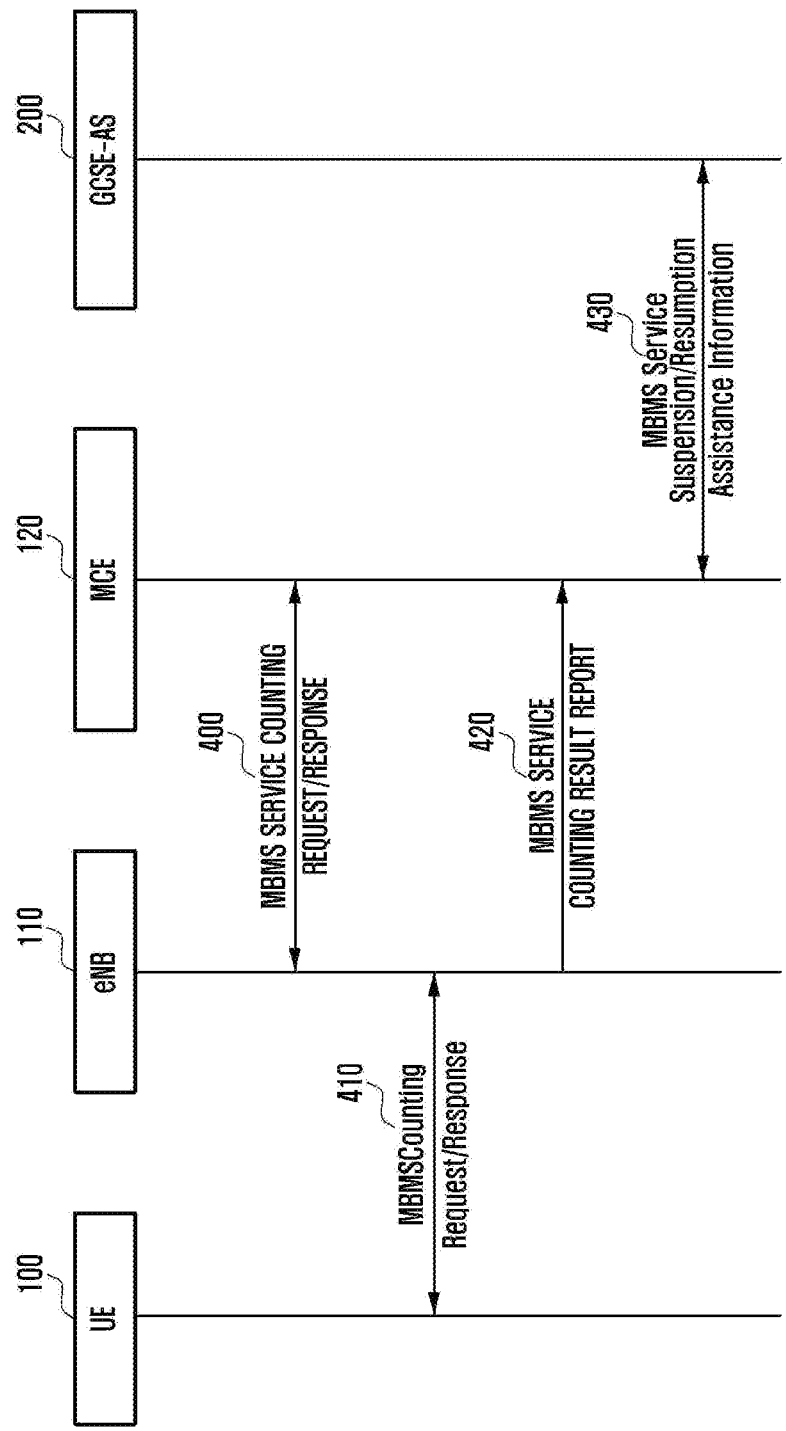
FIG. 4 is a signal flow diagram illustrating a procedure of collecting information for making determination switching between the PTP and MBMS modes to improve the resource utilization efficiency according to an embodiment of the present invention.

FIG. 4 is a signal flow diagram illustrating a procedure of collecting information for making determination switching between the PTP and MBMS modes to improve the resource utilization efficiency according to an embodiment of the present invention.

According to an embodiment of the present invention, it is possible to count a number of UEs 100 receiving the service actually on the corresponding bearer and notify the GCSE-AS 200 of the value such that the GCSE-AS 200 makes determination of switching between the PTP and MBMS modes.

Referring to FIG. 4, the MCE 120 may send the eNB 110 an MBMS SERVICE COUNTING REQUEST message at step 400. This message may include the TMGI so as to indicate the number of UEs receiving a certain service. Depending on embodiment, step 400 may be triggered by a request received directly from another entity (e.g. GCSE-AS 200 and BM-SC 180) or indirectly via other entities.

The eNB 110 and the UE 100 may exchange MBM-SCountingRequest and MBMSCountingResponse messages to check whether the UE 100 is receiving the MBMS service.

The eNB 110 may send the MCE 120 the information on the number of UEs 100 which are receiving the service for the requested TMGI at step 420.

At step 430, the MCE 120 may send the GCSE-AS 200 a part or whole of the information included in the MBMS SERVICE COUNTING RESULT REPORT message received from the eNB 110 at step 420. The information may be transmitted directly through a new interface defined between the MCE 120 and the GCSE-AS 200 or through a path of MCE 120-MME 140-MBMS GW 170-BM-SC 180-GCSE-AS 200. In the latter case, the Counting Result per TMGI may be transmitted to the GCSE-AS 200 via the GC2 interface 185 defined newly for group communication. The GCSE-AS 200 may determine switching between the PTP and MBMS modes based on the received information. For example, if there are a large number of UEs 100 receiving or interested in receiving the service for the corresponding TMGI, the GCSE-AS 200 may switch to the MBMS mode (if the UE 100 is receiving the service in the PTP mode)/maintain the MBMS mode (if the UE 100 is receiving the service in the MBMS mode). If there are a small number of UEs 100 receiving or interested in receiving the service for the corresponding TMGI, the GCSE-AS 200 may switch to the PTP mode (if the UE 100 is receiving the service in the MBMS mode)/maintain the PTP mode (if the UE 100 is receiving the service in the PTP mode). How to switch to the PTP mode may follow part or whole of the process from step 270 to step 290.

As well as the above described method, the GCSE-AS 200 may acquire the information necessary for making determination of switching between the PTP and MBMS modes from a message transmitted through the GC1 interface (which may be application level) between the GCSE-AS 200 and the UE 100. At this time, the GCSE-AS 200 notify the UE 100 of the transmission mode for providing the service using the GC1 message. Thus the UE 100 may notify the GCSE-AS 200 that the service is provided in the PTP mode or the MBMS mode (after transitioning to the connected mode, if it is in the idle mode). The GCSE-AS 200 makes determination of switching between the PTP and MBMS modes based on the information provided by the UE 100.

Figure 5:
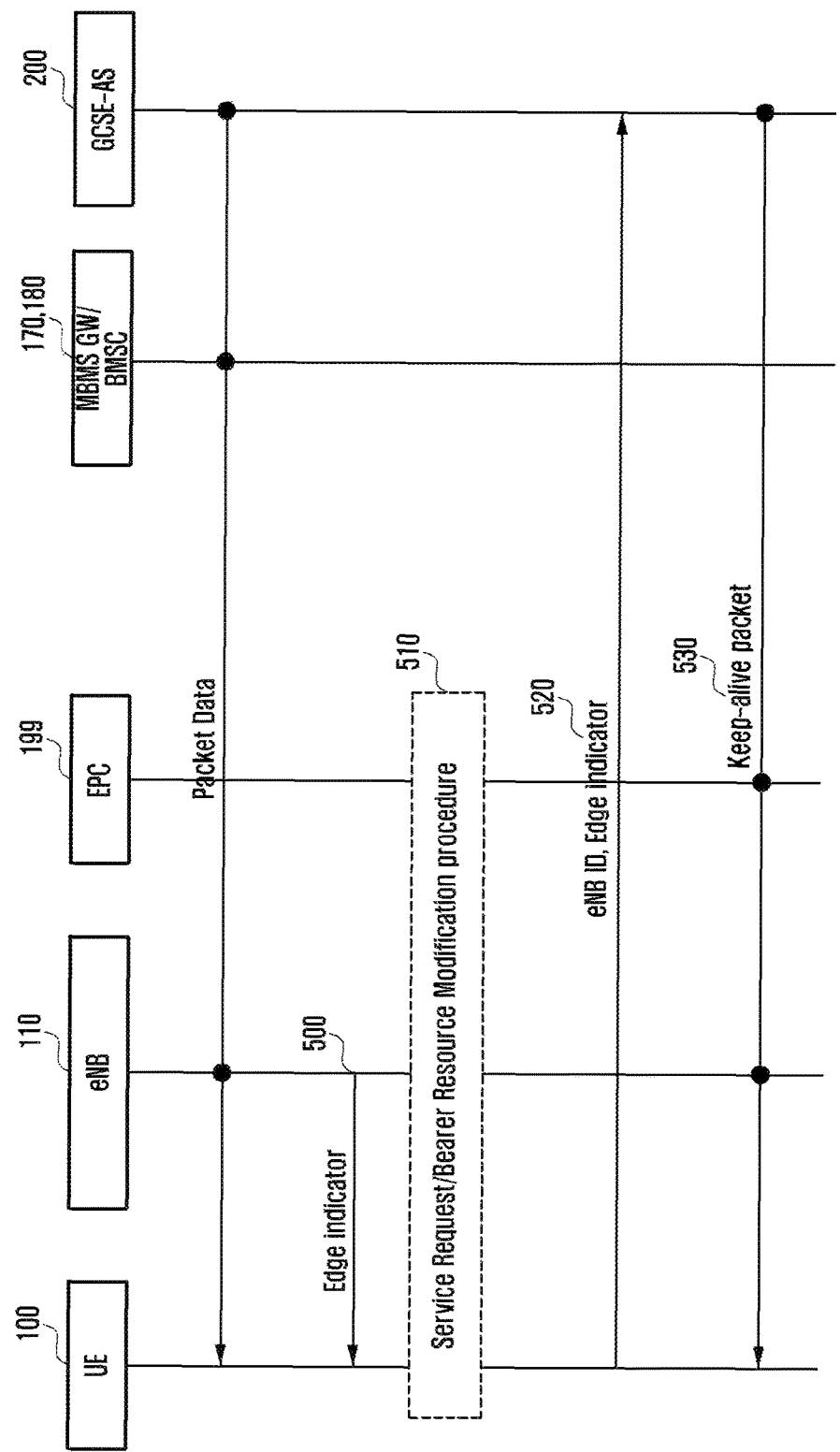
FIG. 5 is a signal flow diagram illustrating a procedure of providing a UE 100 in the idle mode with a group communication service seamlessly according to an embodiment of the present invention.

FIG. 5 is a signal flow diagram illustrating a procedure of providing a UE 100 in the idle mode with a group communication service seamlessly according to an embodiment of the present invention.

According to an embodiment of the present invention, it is possible to transmit an indicator to a UE 100 which is receiving the MBMS service at the edge of MBSFN area and/or MBMS area such that the UE 100 transitions to the connected mode. In an alternative embodiment, this may be applied to the UE 100 in the connected mode to maintain the service continuity for the UE 100 located at the edge of the MBSFN area and/or MBMS service area.

Referring to FIG. 5, the eNB 110 may send the UE 100 an edge indicator at step 500. Depending on embodiment, the eNB which transmits the edge indicator may be located at the edge of the MBSFN area and/or MBMS service area. Depending on embodiment, the edge indicator may be transmitted on BCCH or MCCH. At this time, the edge indicator may include at least one of an indicator indicating that the corresponding cell/eNB 110 is located at the edge, TMGI, ServiceId, MBMS session identifier, and one or more MBMS SAIs.

Depending on embodiment, the UE 100 may judge that it is located at the edge based on self-measurement result. For example, the UE 100 may compare at least one of the parameters acquired from the measurement result with a specific threshold to determine whether it is located at the edge. The threshold may be a value received from the GCSE-AS 200, the eNB 110, and/or the EPC 199. For example, the UE 100 may receive the threshold value through a GC1 message, an RRC message, a SystemInformationBlock, or a NAS message.

Depending on embodiment, the measurement result may be a result of measurement of a Reference Signal (RS). Examples of the RS may include Channel State Information Reference Signal (CSI-RS) and a Cell-specific Reference Signal (CRS). The UE may compare the measurement result and the threshold value to determine whether is it located at the boundary.

Depending on embodiment, the eNB 100 or the EPC 199 may receive the threshold value directly from the GCSE-AS 200 or via at least one entity (e.g. BM-SC, MBMS-GW, MCE, P-GW, S-GW, and MME). The eNB 100 or the EPC 199 may forward the received threshold value to the UE 100. Although not shown in the drawing, the threshold value may be transmitted from the GCSE-AS 200 to the eNB 100 or the EPC 199 via the MCE 120, MBMS-GW 170, or the BM-SC 180.

The UE 100 may transition to the connected mode at step 510. At this time, an RRCConnectionRequest message may be transmitted. The message may include an establishment cause (EstablishmentCause) set to one of mo-Signalling, mo-Data, delayTolerantAccess, highPriorityAccess, and a new MBMS-related cause. The UE may trigger a service request or bearer resource update procedure.

The UE 100 which has transitioned to or been in the connected mode (if the UE has been in the connected mode, step 510 may be omitted) may trigger the GCSE-AS 200 to perform an operation for preparing service continuity and/or receiving a keep-alive message. This can be accomplished by transmitting a GC1 message to the GCSE-AS 200.

In more detail, the UE 100 may send the GCSE-AS 200 at least one of an eNB identifier, a cell identifier, an indicator indicating departing from the corresponding MBSFN area and/or MBMS service area, and part/whole of the information included in the edge indicator. In an embodiment, if the GCSE-AS 200 has the information on the location of the eNB 110 although the UE 100 sends the GCSE-AS 200 only the eNB identifier or cell identifier, it may not necessary to notify the GCSE-AS 200 that the eNB is located at the edge of the MBSFN area and/or MBMS service area. Thus the GCSE-AS 200 may recognize that the UE 100 is located at the edge of the MBSFN area and/or MBMS service area.

Depending on embodiment, as well as the method for the GCSE-AS 200 to recognize that the UE 100 is located at the edge of the MBSFN area and/or MBMS service area based on the edge indicator transmitted at step 520, the GCSE-AS 200 may receive the information on the cell serving the UE 100 from the ECP 199. In more detail, although not shown in the drawing, the P-GW 160 may receive a Change Notification message via the MME 140 and the S-GW 150. The P-GW 160 may send the GCSE-AS 200 the cell information included in the Change Notification message directly or via the PCRF 190.

If the UE 100 stays long at the edge of the MBSFN area and/or MBMS service area, it may transition between the idle and connected modes unnecessarily. In order to protect against this, the GCSE-AS 200 may send the UE located at the edge the keep-alive message at an appropriate interval at step 530. Depending on embodiment, the appropriate interval may need to be shorter than the UE inactivity timer.

The GCSE-AS 200 may transmit/receive the corresponding group communication data through the PTP path to maintain the service continuity in addition to the operation of transmitting the keep-alive message at the appropriate interval. Thus the UE 100 may receive the group communication service through the PTP path even when it becomes impossible to transmit the group communication data through the PTM path. The eNB as a target in establishing or modifying the PTP path may be the eNB including the cell in which the UE 100 is served through the MBMS path or one of the other eNBs. The other eNBs may be the eNBs located outside the MBSFN area and/or MBMS service area in which the UE has been served. Since the related procedure has been described above with reference to FIGS. 2 and 3, detailed description thereof is omitted herein. For example, the procedure may follow part or whole of the process from step 270 to step 290.

Figure 6:
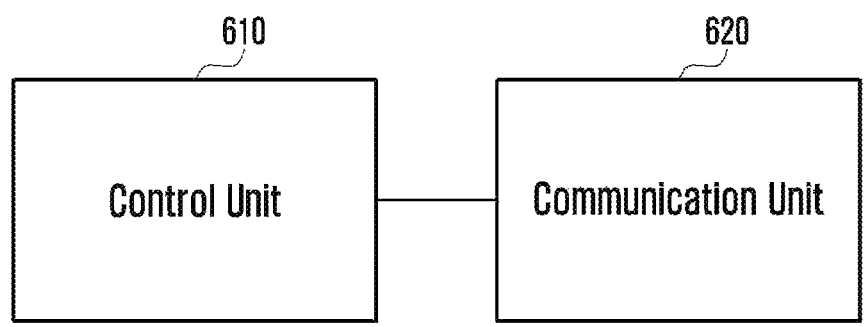
FIG. 6 is a block diagram illustrating a configuration of the eNB according to an embodiment of the present invention.

FIG. 6 is a block diagram illustrating a configuration of the eNB according to an embodiment of the present invention.

Referring to FIG. 6, the eNB according to an embodiment of the present invention may include a communication unit 620 and a control unit 610. The control unit 610 controls the eNB to perform the operation of one of the above-described embodiments. For example, the control unit 610 may control the eNB to receive MBMS bearer information including a QoS parameter from an MCE, update the bearer information for the UE using the MBMS bearer information, determine handover of the UE, transmit a handover request message including MBMS bearer information to the MME or the second eNB which does not supporting MBMS, transmit a handover command message to the UE, and forwards the MBMS data to the second eNB during a predetermined period.

The communication unit 620 of the eNB transmits/receives signals according to one of the above-described embodiments. For example, the communication unit 620 receives the MBMS bearer information including the QoS parameter from the MCE and forwards the MBMS data to the second eNB during the predetermined period.

Figure 7:
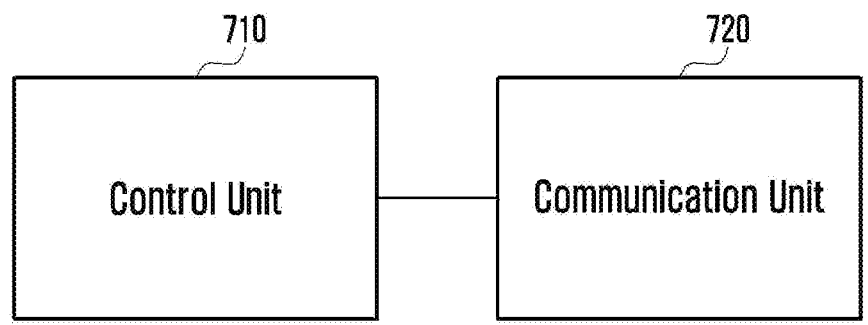
FIG. 7 is a block diagram illustrating a configuration of the UE according to an embodiment of the present invention.

FIG. 7 is a block diagram illustrating a configuration of the UE according to an embodiment of the present invention.

Referring to FIG. 7, the UE according to an embodiment of the present invention may include a communication unit 710 and a control unit 710. The control unit 710 of the UE controls the UE to perform the operation of one of the above-described embodiments. For example, the control unit 710 controls the UE to transmit a message including the information notifying that it is receiving or interested in receiving the MBMS service to the first eNB received the MBMS bearer information including a QoS parameter from the MCE, receive a handover command message indicating handover to the second eNB which does not support MBMS according to the handover decision of the first eNB, establish a connection to the second eNB, receive the MBMS message which is forwarded from the first eNB to the second eNB during a predetermined period from the second eNB, transmit a message including the information notifying the GCSE-AS of the unavailability of the MBMS service, and establish a bearer with the second eNB.

The communication unit 720 of the UE transmits/receives signals according to one of the above-described embodiments. For example, the communication unit 720 may send the first eNB a message including the information notifying that it is receiving or interested in receiving the MBMS service and receive the MBMS data through the first and second eNBs.

Figure 8:
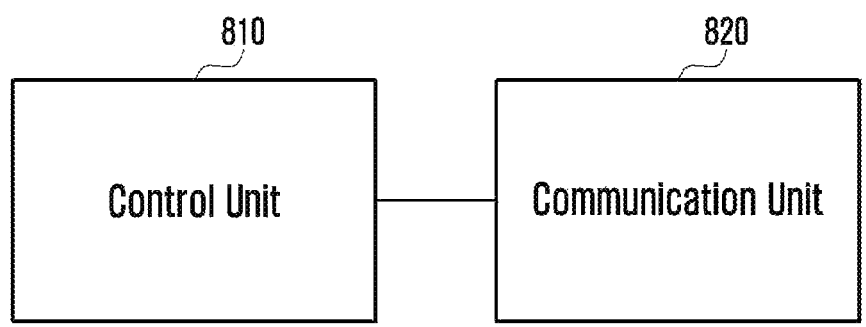
FIG. 8 is a block diagram illustrating a configuration of the GCSE-AS according to an embodiment of the present invention.

FIG. 8 is a block diagram illustrating a configuration of the GCSE-AS according to an embodiment of the present invention.

The GCSE-AS according to an embodiment of the present invention may include a communication unit 820 and a control unit 810. The control unit 810 controls the GCSE-AS to perform the operation of one of the above-described embodiments. For example, the control unit 810 controls the GCSE-AS to receive a message including the information notifying of the unavailability of the MBMS service from the UE and provide the UE with the PTP service via the second eNB based on the information. The control unit 810 also may control the GCSE-AS to receive an edge indicator indicating that the UE is located at the edge of a MBMS service area from the UE and transmit a keep-alive message to the UE. The control unit also may control the GCSE-AS to judge switching between the PTP and MBMS modes according to the information on the number of UEs receiving the MBMS service from the MCE.

The communication unit 820 of the GCSE-AS transmits/receives signals according to one of the above-described embodiments. For example, the communication unit 820 may receive a message including the information notifying of the unavailability of the MBMS service from the UE and transmits a keep-alive message to the UE when the edge indicator indicating that the UE is located at the edge of the MBMS service area. The communication unit 820 also may receive the information on the number of UEs which are receiving the MBMS service from the MCE.

In the above-described embodiments, the steps and message transmissions may be performed selectively or omitted. In each embodiment, the steps are not necessary to be performed in the sequential order as depicted but may be performed in a changed order. The message transmission may not necessary to be performed in the sequential order.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

Accordingly, it should be understood that above-described embodiments are essentially for illustrative purpose only but not in any way for restriction thereto. Thus the scope of the invention should be determined by the appended claims and their legal equivalents rather than the specification, and various alterations and modifications within the definition and scope of the claims are included in the claims.

The invention claimed is:

1. A method for communication by a base station in a mobile communication system, the method comprising:

acquiring quality of service class identifiers (QCIs) for bearers;
determining packet delay budgets corresponding to a QCI for a mission critical push to talk (MCPTT) user data and a QCI for a MCPTT signaling; and
transmitting data to a terminal based on the packet delay budgets,
wherein the QCIs are determined by a policy and charging rules function (PCRF) and a broadcast multicast service center (BM-SC).

2. The method of claim 1, wherein each of the QCIs correspond to a service characteristic which is defined at an application layer between the terminal and an application server.

3. The method of claim 1, wherein each of the QCIs correspond to a priority level.

4. The method of claim 1, further comprising:
determining information associated with discontinuous reception (DRX) based on the packet delay budgets, and
transmitting the data based on the information associated with DRX.

5. A method for communication by a terminal in a mobile communication system, the method comprising:
transmitting a service identifier to an application server to define a service characteristic at an application layer between the terminal and the application server; and
receiving data based on packet delay budgets corresponding to a quality of service class identifier (QCI) for a mission critical push to talk (MCPTT) user data and a QCI for a MCPTT signaling, the QCIs corresponding to the service characteristic,
wherein the QCIs are determined by a policy and charging rules function (PCRF) and a broadcast multicast service center (BM-SC).

6. The method of claim 5, wherein each of the QCIs correspond to a priority level.

7. The method of claim 5, further comprising:
receiving the data based on information associated with discontinuous reception (DRX) determined based on the packet delay budgets.

8. A base station in a mobile communication system, the base station comprising:
a transceiver configured to transmit and receive a signal; and
at least one processor configured to:
acquire quality of service class identifiers (QCIs) for bearers,
determine packet delay budgets corresponding to a QCI for a mission critical push to talk (MCPTT) user data and a QCI for a MCPTT signaling, and
transmit data to a terminal based on the packet delay budgets,
wherein the QCIs are determined by a policy and charging rules function (PCRF) and a broadcast multicast service center (BM-SC).

9. The base station of claim 8, wherein each of the QCIs correspond to a service characteristic which is defined at an application layer between the terminal and an application server.

10. The base station of claim 8, wherein each of the QCIs correspond to a priority level.

11. The base station of claim 8, wherein the at least one processor is further configured to:
determine information associated with discontinuous reception (DRX) based on the packet delay budgets, and
transmitting the data based on the information associated with DRX.

12. A terminal in a mobile communication system, the terminal comprising:
a transceiver configured to transmit and receive a signal; and
at least one processor configured to:
transmit a service identifier to an application server to define a service characteristic at an application layer between the terminal and the application server, and
receive data based on packet delay budgets corresponding to a quality of service class identifier (QCI) for a mission critical push to talk (MCPTT) user data and a QCI for a MCPTT signaling, the QCIs corresponding to the service characteristic,
wherein the QCIs are determined by a policy and charging rules function (PCRF) and a broadcast multicast service center (BM-SC).

13. The terminal of claim 12, wherein each of the QCIs correspond to a priority level.

14. The terminal of claim 12, wherein the at least one processor is further configured to receive the data based on information associated with discontinuous reception (DRX) determined based on the packet delay budgets.

* * * * *